(12) United States Patent
Atsushi et al.

(10) Patent No.: US 8,210,619 B2
(45) Date of Patent: Jul. 3, 2012

(54) BRAKING CONTROL SYSTEM OF TWO-WHEELED MOTOR VEHICLE

(75) Inventors: Hiroaki Atsushi, Yokohama (JP); Tohru Masuno, Yokohama (JP)

(73) Assignee: Bosch Corporation, Tokyo (JP)

( * ) Notice: Subject to any disclaimer, the term of this patent is extended or adjusted under 35 U.S.C. 154(b) by 370 days.

(21) Appl. No.: 12/447,330

(22) PCT Filed: Oct. 23, 2007

(86) PCT No.: PCT/JP2007/070613
§ 371 (c)(1),
(2), (4) Date: Apr. 27, 2009

(87) PCT Pub. No.: WO2008/050744
PCT Pub. Date: May 2, 2008

(65) Prior Publication Data
US 2010/0066160 A1 Mar. 18, 2010

(30) Foreign Application Priority Data

Oct. 26, 2006 (JP) ................................. 2006-291215
Dec. 1, 2006 (JP) ................................. 2006-325410
Feb. 21, 2007 (JP) ................................. 2007-040479

(51) Int. Cl.
*B60T 13/00* (2006.01)
(52) U.S. Cl. .................................................... 303/9.64
(58) Field of Classification Search ................. 303/9.64, 303/155, 9.71, 137; 188/344, 345
See application file for complete search history.

(56) References Cited

U.S. PATENT DOCUMENTS

| | | | | |
|---|---|---|---|---|
| 4,494,800 A | * | 1/1985 | Hayashi | ........................ 303/9.64 |
| 5,219,211 A | * | 6/1993 | Tsuchida et al. | .............. 303/9.64 |
| 5,372,408 A | | 12/1994 | Tsuchida et al. | |
| 5,501,511 A | * | 3/1996 | Wagner | ........................ 303/9.64 |
| 6,390,566 B1 | * | 5/2002 | Matsuno | ....................... 303/9.64 |
| 6,409,285 B1 | | 6/2002 | Wakabayashi et al. | |
| 6,793,295 B2 | * | 9/2004 | Sakamoto | ..................... 303/9.64 |
| 2003/0015916 A1 | | 1/2003 | Sakamoto | |
| 2006/0082216 A1 | | 4/2006 | Hamm et al. | |
| 2007/0200430 A1 | * | 8/2007 | Tani | ............................... 303/137 |

FOREIGN PATENT DOCUMENTS

| | | |
|---|---|---|
| JP | 5281482 A | 7/1977 |
| JP | 6131988 U | 2/1986 |
| JP | 5246374 A | 9/1993 |

(Continued)

*Primary Examiner* — Robert A Siconolfi
*Assistant Examiner* — Stephen Bowes
(74) *Attorney, Agent, or Firm* — Ronald E. Greigg

(57) ABSTRACT

An object of the invention is to provide a braking control system of a two-wheeled motor vehicle, by which when a front-and-rear-wheel-interlocked brake operates, operation feeling of a brake lever is improved, and consequently more natural operation feeling may be provided. A braking control system of a two-wheeled motor vehicle according to the invention performs front-and-rear-wheel-interlocked braking control that allows a front-wheel brake and a rear-wheel brake to operate in an interlocked manner. The front-wheel brake is configured of a front-wheel first brake and a front-wheel second brake. ECU 400 controls a front-wheel hydraulic circuit 100 so that the first brake operates according to the front-and-rear-wheel-interlocked braking control. Furthermore, the ECU 400 controls the front-wheel hydraulic circuit 100 so that the front-wheel second brake receives hydraulic pressure caused along with operation of a brake lever 101 during performing the front-and-rear-wheel-interlocked braking control. Thus, operation feeling of the brake lever 101 is improved.

33 Claims, 8 Drawing Sheets

FOREIGN PATENT DOCUMENTS

| | | |
|---|---|---|
| JP | 5310114 A | 11/1993 |
| JP | 6211120 A | 8/1994 |
| JP | 7285484 A | 10/1995 |
| JP | 8230747 A | 9/1996 |
| JP | 2000071963 A | 3/2000 |
| JP | 2000272572 A | 10/2000 |
| JP | 200325978 A | 1/2003 |
| JP | 2005212680 A | 8/2005 |
| JP | 2006117233 A | 5/2006 |

* cited by examiner

BRAKING CONTROL SYSTEM OF TWO-WHEELED MOTOR VEHICLE

TECHNICAL FIELD

The present invention relates to a braking control system of a two-wheeled motor vehicle, and more particularly, relates to a braking control system of a two-wheeled motor vehicle, in which operation feeling of a brake lever is improved.

BACKGROUND ART

In a two-wheeled motor vehicle, a front-wheel brake is operated by a right brake lever, and a rear-wheel brake is operated by a right brake pedal. If braking force is not appropriately balanced between the front and rear wheels, the two-wheeled motor vehicle may be fallen down. Thus, a driver needs to operate the right brake lever and the right brake pedal so as to appropriately keep balance of braking force between the front and rear wheels. Furthermore, for example, patent documents 1, 2 and 3 propose front-and-rear-wheel-interlocked braking systems respectively, in which balance of braking force between the front and rear wheels is appropriately controlled regardless of how a driver operates the lever and the pedal.

Each of the front-and-rear-wheel-interlocked braking systems has an antilock braking system (ABS), and has a front-wheel brake circuit and a rear-wheel brake circuit, where the respective brake circuits operate in an interlocked manner depending on braking operation, so that balance of braking force between the front and rear wheels is automatically appropriately controlled.

In the invention of the application, while being described later, backflow check means such as a check valve is provided in a pipeline for connecting between two wheel cylinders. However, patent documents 4 and 5 disclose systems, in each of which a check valve is provided in a pipeline for connecting between two wheel cylinders.

Patent document 1: JP-A-2000-719.63
Patent document 2: JP-A-2005-212680
Patent document 3: JP-A-2003-25978
Patent document 4: JP-A-6-211120
Patent document 5: JP-A-5-310114

DISCLOSURE OF THE INVENTION

Problems to be Solved by the Invention

However, the system of the patent document 1 has a problem that when a front-and-rear-wheel-interlocked braking system operates, a front-wheel-side hydraulic circuit is increased in pressure, so that pressure in a front-wheel-side master cylinder is increased, therefore a brake lever does not work smoothly, leading to unnatural braking feeling of a driver.

In the system of the patent document 2, when a driver operates one brake and thus a front-and-rear-wheel-interlocked braking system is activated, a master cylinder is separated from a hydraulic circuit for the other brake, and the master cylinder is connected to a reaction generator. Then, the driver feels braking operation feeling simulatively represented by the reaction generator, so that variation in hydraulic pressure caused by the interlocked brake is not transmitted to the driver. However, the braking operation feeling simulatively represented by the reaction generator may not correspond to natural operation feeling, in addition, number of components may be increased by providing the reaction generator, leading to a complicated circuit configuration.

In the system of the patent document 3, when a brake pedal is pressed on for braking a rear wheel, operation feeling of a brake lever for operating a front-wheel master cylinder is improved. However, the front-and-rear-wheel-interlocked braking system of the patent document 3 is simply designed such that when the brake lever is operated to brake the front wheel, the rear wheel is braked in an interlocked manner, and not designed such that when the brake pedal is operated to brake the rear wheel, the front wheel is braked in an interlocked manner. That is, the system is not a perfect front-and-rear-wheel-interlocked braking system.

Therefore, an object of the invention is to provide a braking control system of a two-wheeled motor vehicle, by which when a front-and-rear-wheel-interlocked brake operates in a perfect front-and-rear-wheel-interlocked braking system, operation feeling of a brake lever is improved, and consequently more natural operation feeling may be provided.

As described above, in the system of the patent document 1 or the like, when a brake pedal is pressed on for braking a rear wheel, operation feeling of a brake lever for operating a front-wheel master cylinder is improved. However, the front-and-rear-wheel-interlocked braking system of the patent document 1 is simply designed such that when the brake lever is operated to brake the front wheel, the rear wheel is braked in an interlocked manner, and not designed such that when the brake pedal is operated to brake the rear wheel, the front wheel is braked in an interlocked manner. That is, the system is not a perfect front-and-rear-wheel-interlocked braking system.

Therefore, an object of the invention is to provide a braking control system of a two-wheeled motor vehicle, by which when a front-and-rear-wheel-interlocked brake operates in a perfect front-and-rear-wheel-interlocked braking system, operation feeling of a brake lever is improved, and consequently more natural operation feeling may be provided.

In each of the systems of the patent document 4 or 5, the two wheel cylinders connected by the pipeline having the check valve brake different wheels respectively. Thus, each of systems does not relate to improvement in operation feeling of a brake lever of a front-and-rear-wheel-interlocked brake of a two-wheeled motor vehicle as above, and is completely different from the relevant system.

Means for Solving the Problems

To solve the above problem, a first invention according to a first embodiment includes a braking control system of a two-wheeled motor vehicle, which has a brake lever 101, a front-wheel brake to be actuated by the brake lever 101, a front-wheel hydraulic circuit 100 transmitting operation of the brake lever 101 to the front-wheel brake, a brake pedal 201, a rear-wheel brake to be actuated by the brake pedal 201, a rear-wheel hydraulic circuit 200 transmitting operation of the brake pedal 201 to the rear-wheel brake, and a control unit (ECU) 400 performing front-and-rear-wheel-interlocked braking control that allows the front-wheel brake and the rear-wheel brake to operate in an interlocked manner, the braking control system being characterized in that the front-wheel brake is configured of a front-wheel first brake and a front-wheel second brake, and the control unit 400 controls the front-wheel hydraulic circuit 100 such that one of the front-wheel first brake and the front-wheel second brake is selected, and the selected one brake operates according to the front-and-rear-wheel-interlocked braking control, and furthermore, the control unit 400 controls the front-wheel hydraulic circuit 100 such that the other of the front-wheel first brake and the front-wheel second brake receives hydraulic pressure caused along with operation of the brake lever during performing the front-and-rear-wheel-interlocked braking control.

A second invention according to the first embodiment includes the braking control system of a two-wheeled motor vehicle, which is characterized in that the front-wheel hydraulic circuit 100 has a front-wheel-side master cylinder 103 connected to the brake lever 101, a front-wheel-side switching valve 107 connected to the front-wheel-side master cylinder 103, a front-wheel-side first inlet valve 113a that is connected to the front-wheel-side switching valve 107 at one end, and connected to the front-wheel first brake at the other end, a front-wheel-side second inlet valve 113b that is connected to the front-wheel-side switching valve 107 at one end, and connected to the front-wheel second brake at the other end, a front-wheel-side first outlet valve 123a that is connected to the front-wheel first brake to relieve hydraulic pressure of the front-wheel first brake, a front-wheel-side second outlet valve 123b that is connected to the front-wheel second brake to relieve hydraulic pressure of the front-wheel second brake, a front-wheel-side hydraulic pump 119 connected to the front-wheel-side first outlet valve 123a and to the front-wheel-side second outlet valve 123b, and a front-wheel-side high-pressure intake valve 109 that is connected to the front-wheel-side master cylinder 103 at one end, and connected to a suction side of the front-wheel-side hydraulic pump 119 at the other end; and in the case that the rear-wheel brake is operated, and the front-wheel brake is not operated, to perform the front-and-rear-wheel-interlocked braking control, the control unit 400 actuates the front-wheel-side hydraulic pump 119 so as to open one of the front-wheel-side first inlet valve 113a and the front-wheel-side second inlet valve 113b, and close the other of the front-wheel-side first inlet valve 113a and the front-wheel-side second inlet valve 113b, thereby the one of the front-wheel first brake and the front-wheel second brake is increased in pressure by the front-wheel-side hydraulic pump 119 and thus used for the front-and-rear-wheel-interlocked braking control in a manner of being interlocked with the rear-wheel brake, and the control unit opens the other of the front-wheel-side first inlet valve 113a and the front-wheel-side second inlet valve 113b, which has been closed, such that the other of the front-wheel first brake and the front-wheel second brake receives the hydraulic pressure caused along with operation of the brake lever 101 during the pressure increase.

A third invention according to the first embodiment includes the braking control system of a two-wheeled motor vehicle, which is characterized in that the control unit 400 controls the front-wheel-side high-pressure intake valve 109 to be opened regardless of presence of operation of the brake lever 101 during the pressure increase.

A fourth invention according to the first embodiment includes the braking control system of a two-wheeled motor vehicle, which is characterized by having a front-wheel first-brake pressure sensor 127a that detects pressure in a pipeline 114a between the front-wheel-side first inlet valve 113a and the front-wheel first brake, and transmits a pressure signal to the control unit 400, a front-wheel second brake pressure sensor 127b that detects pressure in a pipeline 114b between the front-wheel-side second inlet valve 113b and the front-wheel second brake, and transmits a pressure signal to the control unit 400.

A fifth invention according to the first embodiment includes the braking control system of a two-wheeled motor vehicle, which is characterized in that the rear-wheel hydraulic circuit 200 has a rear-wheel-side master cylinder 203 connected to the brake pedal 201, a rear-wheel-side switching valve 207 connected to the rear-wheel-side master cylinder 203, a rear-wheel-side inlet valve 213 that is connected to the rear-wheel-side switching valve 207 at one end, and connected to the rear-wheel brake at the other end, a rear-wheel-side outlet valve 223 that is connected to the rear-wheel brake to relieve hydraulic pressure of the rear-wheel brake, a rear-wheel-side hydraulic pump 219 connected to the rear-wheel-side outlet valve 223, and a rear-wheel-side high-pressure intake valve 209 that is connected to the rear-wheel-side master cylinder 203 at one end, and connected to a suction side of the rear-wheel-side hydraulic pump 219 at the other end; and in the case that operation amount of the rear-wheel brake does not reach a predetermined value with respect to operation amount of the front-wheel brake 101, to interlock the rear-wheel brake with the front-wheel brake, the control unit 400 actuates the rear-wheel-side hydraulic pump 219 to increase pressure of the rear-wheel brake by the rear-wheel-side hydraulic pump 219 so that the rear-wheel brake is actuated and used for the front-and-rear-wheel-interlocked braking control.

A sixth invention according to the first embodiment includes the braking control system of a two-wheeled motor vehicle, which is characterized in that the control unit 400 switches between the front-wheel first brake and the front-wheel second brake according to a beforehand determined condition so that the relevant brake is used for the front-and-rear-wheel-interlocked braking control.

To solve the above problem, a first invention according to a second embodiment includes a braking control system of a two-wheeled motor vehicle, which has a first braking operation unit 101, first-wheel brakes 115a and 115b to be actuated by the first braking operation unit 101, a first-wheel hydraulic circuit 100 transmitting operation of the first braking operation unit 101 to the first-wheel brakes 115a and 115b, a second braking operation unit 201, a second-wheel brake 215 to be actuated by the second braking operation unit 201, a second-wheel hydraulic circuit 200 transmitting operation of the second braking operation unit 201 to the second-wheel brake 215, and a control unit 400 performing both-wheel-interlocked braking control that allows the first-wheel brake 115a and the second-wheel brake 215 to operate in an interlocked manner, the braking control system being characterized in that the first-wheel brakes are configured of a first-wheel interlocked brake 115a that operates according to the both-wheel-interlocked braking control, and a first-wheel non-interlocked brake 115b that does not operate according to the both-wheel-interlocked braking control.

A second invention according to the second embodiment includes the braking control system of a two-wheeled motor vehicle, which is characterized in that the first-wheel non-interlocked brake 115b receives hydraulic pressure caused along with operation of the first braking operation unit 101 during performing the both-wheel-interlocked braking control.

A third invention according to the second embodiment includes the braking control system of a two-wheeled motor vehicle, which is characterized by having a first-wheel-side master cylinder 103 connected to the first braking operation unit 101, wherein the first-wheel-side master cylinder 103 is hydraulically connected to the first-wheel non-interlocked brake 115b during performing the both-wheel-interlocked braking control.

A fourth invention according to the second embodiment includes the braking control system of a two-wheeled motor vehicle, which is characterized in that the first-wheel hydraulic circuit 100 has a first-wheel-side master cylinder 103 connected to the first braking operation unit 101, a firstwheel-side switching valve 107 connected to the first-wheel-side master cylinder 103, a first-wheel-side first inlet valve 113a that is connected to the first-wheel-side switching valve 107 at one end, and connected to the first-wheel interlocked brake 115a at the other end, a first-wheel-side second inlet valve 113b that is connected to the first-wheel-side master cylinder 103 at one end, and connected to the first-wheel non-interlocked brake 115b at the other end, a first-wheel-side first outlet valve 123a that is connected to the first-wheel interlocked brake 115a to relieve hydraulic pressure of the first-wheel interlocked brake 115a, a first-wheel-side second outlet valve 123b that is connected to the first-wheel non-interlocked brake 115b to relieve hydraulic pressure of the first-wheel non-interlocked brake 115b, a first-wheel-side hydraulic pump 119 connected to the first-wheel-side first outlet valve 123a and to the first-wheel-side second outlet valve 123b, and a first-wheel-side intake valve 109 that is connected to the first-wheel-side master cylinder 103 at one end, and connected to a suction side of the first-wheel-side hydraulic pump 119 at the other end; and in the case that the second-wheel brake 215 is operated, and the first-wheel brakes 115a and 115b are not operated, to perform the both-wheel-interlocked braking control, the control unit 400 actuates the first-wheel-side hydraulic pump 119 while the first-wheel-side intake valve 109 is opened, the first-wheel-side switching valve 107 is closed, and the first-wheel-side first inlet valve 113a is opened, thereby the first-wheel interlocked brake 115a is increased in pressure by the first-wheel-side hydraulic pump 119 and thus used for the both-wheel-interlocked braking control in a manner of being interlocked with the second-wheel brake 215, and furthermore, the control unit 400 keeps the first-wheel-side second inlet valve 113b to be opened such that the first-wheel non-interlocked brake 115b receives hydraulic pressure caused along with operation of the first braking operation unit 101 during the pressure increase.

A fifth invention according to the second embodiment includes the braking control system of a two-wheeled motor vehicle, which is characterized in that the first-wheel hydraulic circuit 100 has a first-wheel-side master-cylinder pressure sensor 111 that detects pressure of the first-wheel-side master cylinder 103, and transmits a pressure signal to the control unit 400, and the control unit 400 allows pressure increase in the second-wheel brake 115a based on the pressure detected by the first-wheel-side master-cylinder pressure sensor 111.

A sixth invention according to the second embodiment includes the braking control system of a two-wheeled motor vehicle, which is characterized in that the first-wheel hydraulic circuit 100 has a first-wheel interlocked-brake pressure sensor 127a that detects pressure in a pipeline 114a between the first-wheel-side first inlet valve 113a and the first-wheel interlocked brake 115a, and transmits a pressure signal to the control unit 400, and a first-wheel-non-interlocked-brake pressure sensor 127b that detects pressure in a pipeline 114b between the first-wheel-side second inlet valve 113b and the first-wheel non-interlocked brake 115b, and transmits a pressure signal to the control unit 400.

A seventh invention according to the second embodiment includes the braking control system of a two-wheeled motor vehicle, which is characterized in that the second-wheel hydraulic circuit 200 has a second-wheel-side master cylinder 203 connected to the second braking operation unit 201, a second-wheel-side switching valve 207 connected to the second-wheel-side master cylinder 203, a second-wheel-side inlet valve 213 that is connected to the second-wheel-side switching valve 207 at one end, and connected to the second-wheel brake 215 at the other end, a second-wheel-side outlet valve 223 that is connected to the second-wheel brake 215 to relieve hydraulic pressure of the second-wheel brake 215, a second-wheel-side hydraulic pump 219 connected to the second-wheel-side outlet valve 223, and a second-wheel-side intake valve 209 that is connected to the second-wheel-side master cylinder 203 at one end, and connected to a suction side of the second-wheel-side hydraulic pump 219 at the other end; and in the case that operation amount of the second-wheel brake 215 does not reach a predetermined value with respect to operation amount of the first-wheel brakes 115a and 115b, to interlock the second-wheel brake 215 with the first-wheel brakes 115a and 115b, the control unit 400 actuates the second-wheel-side hydraulic pump 219 to increase pressure of the second-wheel brake 215 by the second-wheel-side hydraulic pump 219 so that the brake 215 is actuated and used for the both-wheel-interlocked braking control.

An eighth invention according to the second embodiment includes the braking control system of a two-wheeled motor vehicle, which is characterized in that the second-wheel hydraulic circuit 200 has a second-wheel-side master-cylinder pressure sensor 211 that detects pressure of the second-wheel-side master cylinder 203, and transmits a pressure signal to the control unit 400, and the control unit 400 allows pressure increase in the first-wheel interlocked brake 215 based on the pressure detected by the second-wheel-side master-cylinder pressure sensor 211.

A ninth invention according to the second embodiment includes the braking control system of a two-wheeled motor vehicle, which is characterized in that the second-wheel hydraulic circuit 200 has a second-wheel brake pressure sensor 227 that detects pressure in a pipeline 214 between the second-wheel-side inlet valve 213 and the second-wheel brake 215, and transmits a pressure signal to the control unit 400.

A tenth invention according to the second embodiment includes the braking control system of a two-wheeled motor vehicle, which is characterized in that the first braking operation unit 101 is manually operated.

To solve the above problem, a first invention according to a third embodiment includes a braking control system of a two-wheeled motor vehicle, which has a first braking operation unit, a first-wheel brake to be actuated by the first braking operation unit, a first-wheel hydraulic circuit transmitting operation of the first braking operation unit to the first-wheel brake, a second braking operation unit, a second-wheel brake to be actuated by the second braking operation unit, a second-wheel hydraulic circuit transmitting operation of the second braking operation unit to the second-wheel brake, and a control unit performing both-wheel-interlocked braking control that allows the first-wheel brake and the second-wheel brake to operate in an interlocked manner, the braking control system being characterized in that the first-wheel brake is configured of a first-wheel interlocked brake that operates according to the both-wheel-interlocked braking control, and a first-wheel non-interlocked brake that does not operate according to the both-wheel-interlocked braking control, and the first-wheel interlocked brake is hydraulically connected to the first-wheel non-interlocked brake so as to prevent transmission of hydraulic pressure from a side of the first-wheel interlocked brake to a side of the first-wheel non-interlocked brake.

A second invention according to the third embodiment includes the braking control system of a two-wheeled motor vehicle, which is characterized in that the first-wheel interlocked brake is hydraulically connected to the first-wheel non-interlocked brake so as to allow only transmission of hydraulic pressure from the side of the first-wheel non-interlocked brake to the side of the first-wheel interlocked brake.

A third invention according to the third embodiment includes the braking control system of a two-wheeled motor vehicle, which is characterized in that the first-wheel non-interlocked brake receives hydraulic pressure caused along with operation of the first braking operation unit during performing the both-wheel-interlocked braking control.

A fourth invention according to the third embodiment includes the braking control system of a two-wheeled motor vehicle, which is characterized by having a first-wheel-side master cylinder connected to the first braking operation unit, wherein the first-wheel-side master cylinder is hydraulically connected to the first-wheel non-interlocked brake during performing the both-wheel-interlocked braking control.

A fifth invention according to the third embodiment includes the braking control system of a two-wheeled motor vehicle, which is characterized in that the first-wheel hydraulic circuit has a first-wheel-side master cylinder connected to the first braking operation unit, a first-wheel-side switching valve connected to the first-wheel-side master cylinder, a first-wheel-side first inlet valve that is connected to the first-wheel-side switching valve at one end, and connected to the first-wheel interlocked brake at the other end, a first-wheel-side second inlet valve that is connected to the first-wheel-side master cylinder at one end, and connected to the first-wheel non-interlocked brake at the other end, a first-wheel-side outlet valve that is connected to the first-wheel interlocked brake and to the first-wheel non-interlocked brake to relive hydraulic pressure of each of the first-wheel interlocked brake and the first-wheel non-interlocked brake, backflow check means that is provided between the first-wheel-side outlet valve and the first-wheel non-interlocked brake, and prevents backflow of hydraulic pressure from the first-wheel interlocked brake to the first-wheel non-interlocked brake, a first-wheel-side hydraulic pump connected to the first-wheel-side outlet valve, and a first-wheel-side intake valve that is connected to the first-wheel-side master cylinder at one end, and connected to a suction side of the first-wheel-side hydraulic pump at the other end; and in the case that the second-wheel brake is operated, and the first-wheel brake is not operated, to perform the both-wheel-interlocked braking control, the control unit actuates the first-wheel-side hydraulic pump while the first-wheel-side intake valve is opened, the first-wheel-side switching valve is closed, and the first-wheel-side first inlet valve is opened, thereby the first-wheel interlocked brake is increased in pressure by the first-wheel-side hydraulic pump and thus used for the both-wheel-interlocked braking control in a manner of being interlocked with the second-wheel brake, and furthermore, the control unit keeps the first-wheel-side second inlet valve to be opened such that the first-wheel non-interlocked brake receives hydraulic pressure caused along with operation of the first braking operation unit during the pressure increase.

A sixth invention according to the third embodiment includes the braking control system of a two-wheeled motor vehicle, which is characterized in that the first-wheel hydraulic circuit has a first-wheel-side master-cylinder pressure sensor that detects pressure of the first-wheel-side master cylinder, and transmits a pressure signal to the control unit, and the control unit allows pressure increase in the second-wheel brake based on the pressure detected by the first-wheel-side master-cylinder pressure sensor.

A seventh invention according to the third embodiment includes the braking control system of a two-wheeled motor vehicle, which is characterized in that the first-wheel hydraulic circuit has a first-wheel interlocked-brake pressure sensor that detects pressure in a pipeline between the first-wheel-side first inlet valve and the first-wheel interlocked brake, and transmits a pressure signal to the control unit.

An eighth invention according to the third embodiment includes the braking control system of a two-wheeled motor vehicle, which is characterized in that the second-wheel hydraulic circuit has a second-wheel-side master cylinder connected to the second braking operation unit, a second-wheel-side switching valve connected to the second-wheel-side master cylinder, a second-wheel-side inlet valve that is connected to the second-wheel-side switching valve at one end, and connected to the second-wheel brake at the other end, a second-wheel-side outlet valve that is connected to the second-wheel brake to relieve hydraulic pressure of the second-wheel brake, a second-wheel-side hydraulic pump connected to the second-wheel-side outlet valve, and a second-wheel-side intake valve that is connected to the second-wheel-side master cylinder at one end, and connected to a suction side of the second-wheel-side hydraulic pump at the other end; and in the case that operation amount of the second-wheel brake does not reach a predetermined value with respect to operation amount of the first-wheel brake, to interlock the second-wheel brake with the first-wheel brake, the control unit actuates the second-wheel-side hydraulic pump to increase pressure of the second-wheel brake by the second-wheel-side hydraulic pump so that the second-wheel brake is actuated and used for the both-wheel-interlocked braking control.

A ninth invention according to the third embodiment includes the braking control system of a two-wheeled motor vehicle, which is characterized in that the second-wheel hydraulic circuit has a second-wheel-side master-cylinder pressure sensor that detects pressure of the second-wheel-side master cylinder, and transmits a pressure signal to the control unit, and the control unit allows pressure increase in the first-wheel interlocked brake based on the pressure detected by the second-wheel-side master-cylinder pressure sensor.

A tenth invention according to the third embodiment includes the braking control system of a two-wheeled motor vehicle, which is characterized in that the second-wheel hydraulic circuit has a second-wheel brake pressure sensor that detects pressure in a pipeline between the second-wheel-side inlet valve and the second-wheel brake, and transmits a pressure signal to the control unit.

An eleventh invention according to the third embodiment includes the braking control system of a two-wheeled motor vehicle, which is characterized in that the first braking operation unit is manually operated.

An invention according to each of fourth and fifth embodiments includes the braking control system of a two-wheeled motor vehicle, the system being characterized by having backflow check means, by which when the one brake operates according to the front-and-rear-wheel-interlocked braking control, braking liquid is prevented from being sucked out from the other brake. In addition, an invention according to each of the fourth and fifth embodiments includes the braking control system of a two-wheeled motor vehicle, the system being characterized by having backflow check means, by which when the first-wheel interlocked brake operates according to the both-wheel-interlocked braking control, braking liquid is prevented from being sucked out from the first-wheel non-interlocked brake.

Advantage of the Invention

According to the invention, when a front-and-rear-wheel-interlocked brake operates, operation feeling of a brake lever is improved, and consequently more natural operation feeling may be provided to a driver.

According to the invention according to claim 7, since a first-wheel interlocked brake is separated from a first-wheel non-interlocked brake, even if the first-wheel interlocked brake operates according to front-and-rear-wheel-interlocked braking control, the first-wheel non-interlocked brake does operate, so that volume of a portion to be increased in pressure is reduced in a front-wheel hydraulic circuit. Therefore, when the first-wheel interlocked brake is increased in pressure, a response characteristic of the first-wheel interlocked brake is improved.

According to the invention according to claim 8, when a front-and-rear-wheel-interlocked brake operates, a first-wheel non-interlocked brake receives hydraulic pressure caused along with operation of a first braking operation unit. Therefore, operation feeling of the first braking operation unit is improved, and consequently more natural operation feeling may be provided to a driver.

According to the invention according to claim 9 or 10, in the case that a first-wheel interlocked brake is increased in pressure, when a first braking operation unit is operated, hydraulic pressure caused along with operation of the first braking operation unit is immediately transmitted to a first-wheel non-interlocked brake being opened while any valve is not changed in opening/closing state. Thus, operation response of the first-wheel non-interlocked brake is improved, and consequently natural operation feeling may be provided to a driver.

According to the invention according to claim 16, since a first braking operation unit is manually operated, a driver may directly feel improved operation feeling of the first braking operation unit through feeling of the driver's hand.

According to the invention according to claim 17, since a first-wheel interlocked brake is separated from a first-wheel non-interlocked brake, even if the first-wheel interlocked brake operates according to front-and-rear-wheel-interlocked braking control, the first-wheel non-interlocked brake does not operate, so that volume of a portion to be increased in pressure is reduced in a front-wheel hydraulic circuit. Therefore, when the first-wheel interlocked brake is increased in pressure, a response characteristic of the first-wheel interlocked brake is improved.

According to the invention according to claim 19, when a front-and-rear-wheel-interlocked brake operates, a first-wheel non-interlocked brake receives hydraulic pressure caused along with operation of a first braking operation unit. Therefore, operation feeling of the first braking operation unit is improved, and consequently more natural operation feeling may be provided to a driver.

According to the invention according to claim 20 or 21, in the case that a first-wheel interlocked brake is increased in pressure, when a first braking operation unit is operated, hydraulic pressure caused along with operation of the first braking operation unit is immediately transmitted to a first-wheel non-interlocked brake being opened while any valve is not changed in opening/closing state. Thus, operation response of the first-wheel non-interlocked brake is improved, and consequently natural operation feeling may be provided to a driver.

According to the invention according to claim 27, since a first braking operation unit is manually operated, a driver may directly feel improved operation feeling of the first braking operation unit through feeling of the driver's hand.

DESCRIPTION OF THE REFERENCE NUMERALS AND SIGNS

100 front-wheel hydraulic circuit (first-wheel hydraulic circuit)
200 rear-wheel hydraulic circuit (second-wheel hydraulic circuit)
300 DC motor
400 ECU (control unit)
101 brake lever (first braking operation unit)
103 front-wheel-side master cylinder (first-wheel-side master cylinder)
107 front-wheel-side switching valve (first-wheel-side switching valve)
109 front-wheel-side intake valve (first-wheel-side intake valve)
113a front-wheel-side first inlet valve (first-wheel-side first inlet valve)
113b front-wheel-side second inlet valve (first-wheel-side second inlet valve)
115a front-wheel-side first caliper (first-wheel-side first caliper)
115b front-wheel-side second caliper (first-wheel-side second caliper)
119 front-wheel-side hydraulic pump (first-wheel-side hydraulic pump)
121 front-wheel-side first check valve (front-wheel-side first backflow-check-means)
125 front-wheel-side reservoir
116 front-wheel-side second check valve (front-wheel-side second backflow-check-means)
130 front-wheel-side third check valve (front-wheel-side third backflow-check-means)
132 front-wheel-side fourth check valve (front-wheel-side fourth backflow-check-means)
134 front-wheel-side fifth check valve (front-wheel-side fifth backflow-check-means)
201 brake pedal (second braking operation unit)
203 rear-wheel-side master cylinder (second-wheel-side master cylinder)
207 rear-wheel-side switching valve (second-wheel-side switching valve)
209 rear-wheel-side intake valve (second-wheel-side intake valve)
213 rear-wheel-side inlet valve (second-wheel-side inlet valve)
215 rear-wheel-side caliper (second-wheel-side caliper)

219 rear-wheel-side hydraulic pump (second-wheel-side hydraulic pump)
221 rear-wheel-side check valve
225 rear-wheel-side reservoir

BEST MODE FOR CARRYING OUT THE INVENTION

Preferred embodiments of a braking control system of the invention, where the system is applied to a two-wheeled motor vehicle, will be described with reference to drawings. In the embodiments, the same members are marked with the same symbols.

[First Embodiment]

Figure 1:
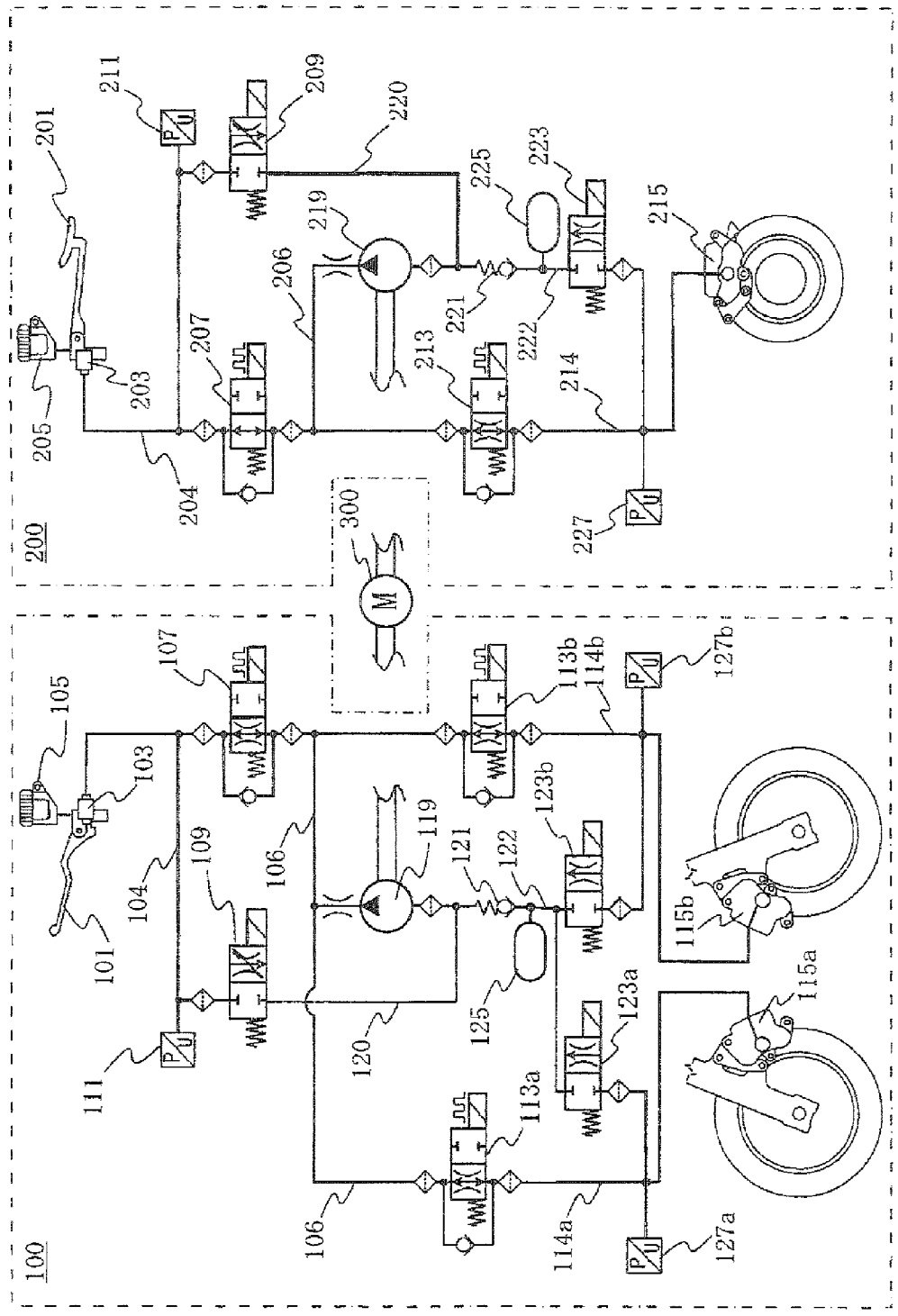
FIG. 1 is a hydraulic circuit diagram used for a braking control system of a first embodiment of the invention.

FIG. 1 shows a hydraulic circuit of a braking control system according to a first embodiment of the invention. The hydraulic circuit is configured of a front-wheel hydraulic circuit 100, a rear-wheel hydraulic circuit 200, and a DC motor 300 for driving respective hydraulic pumps in the front-wheel hydraulic circuit 100 and the rear-wheel hydraulic circuit 200.

First, a configuration of the front-wheel hydraulic circuit 100 is described. The front-wheel hydraulic circuit 100 has a brake lever 101 to be operated by a right hand of a driver, a front-wheel-side master cylinder 103 to be pressurized upon operation of the brake lever 101, a front-wheel-side master cylinder reservoir 105 connected to the front-wheel-side master cylinder 103, a front-wheel-side switching valve 107 connected to the front-wheel-side master cylinder 103 via a pipeline 104, and a front-wheel-side high-pressure intake valve 109 connected to the front-wheel-side master cylinder 103 via the pipeline 104. A filter is provided in a connection between the pipeline 104 and the front-wheel-side switching valve 107, and in a connection between the pipeline 104 and the front-wheel-side high-pressure intake valve 109. Furthermore, a pressure sensor 111 is provided for the pipeline 104. The pressure sensor 111 detects pressure between the front-wheel-side master cylinder 103 and the front-wheel-side switching valve 107, and pressure between the master cylinder 103 and the front-wheel-side high-pressure intake valve 109, and transmits each pressure signal to an electronic control unit ECU 400 described later.

A front-wheel-side first inlet valve 113a and a front-wheel-side second inlet valve 113b are connected to the front-wheel-side switching valve 107 via a pipeline 106 respectively. A filter is provided even in a connection between each of the front-wheel-side switching valve 107, front-wheel-side first inlet valve 113a and front-wheel-side second inlet valve 113b, and the pipeline 106. The front-wheel-side first inlet valve 113a is connected to a front-wheel-side first caliper 115a via a pipeline 114a. The front-wheel-side second inlet valve 113b is connected to a front-wheel-side second caliper 115b via a pipeline 114b.

The braking control system of the invention is connected to a front-wheel brake to be operated by the front-wheel hydraulic circuit 100. The front-wheel brake is configured of a front-wheel first brake including the front-wheel-side first caliper 115a and a front-wheel second brake including the front-wheel-side second caliper 115b.

The front-wheel-side first caliper 115a is connected to the front-wheel-side first inlet valve 113a via the pipeline 114a as described above. The front-wheel-side second caliper 115b is connected to the front-wheel-side second inlet valve 113b via the pipeline 114b as described above.

On the other hand, the pipeline 106 is connected with a discharge side of a front-wheel-side hydraulic pump 119 via a choke. A suction side of the front-wheel-side hydraulic pump 119 is connected to a pipeline 120 via a filter. The front-wheel-side hydraulic pump 119 is driven by the DC motor 300. The pipeline 120 is connected with one end of a front-wheel-side first check valve 121. Furthermore, the pipeline 120 is connected with a discharge port of the front-wheel-side high-pressure intake valve 109. The other end of the front-wheel-side first check valve 121 is connected to a pipeline 122. The front-wheel-side first check valve 121 is disposed to prevent backflow from the pipeline 120 to the pipeline 122.

The front-wheel-side first caliper 115a is connected with an inflow end of a front-wheel-side first outlet valve 123a via the pipeline 114a. An outflow port of the front-wheel-side first outlet valve 123a is connected to the pipeline 122. A filter is provided in a connection between an inflow port of the front-wheel-side first outlet valve 123a and the pipeline 114a. A pressure sensor 127a is provided for the pipeline 114a. The pressure sensor 127a measures pressure in the pipeline 114a, and transmits a pressure signal to the ECU 400.

The front-wheel-side second caliper 115b is connected with an inflow port of a front-wheel-side second outlet valve 123b via the pipeline 114b. An outflow port of the front-wheel-side second outlet valve 123b is connected to the pipeline 122. A filter is provided in a connection between an inflow port of the front-wheel-side second outlet valve 123b and the pipeline 114b. A pressure sensor 127b is provided for the pipeline 114b. The pressure sensor 127b measures pressure in the pipeline 114b, and transmits a pressure signal to the ECU 400.

Next, a configuration of the rear-wheel hydraulic circuit 200 is described using FIG. 1. The rear-wheel hydraulic circuit 200 has a brake pedal 201 to be operated by a right foot of a driver, a rear-wheel-side master cylinder 203 to be pressurized upon operation of the brake pedal 201, a rear-wheel-side master cylinder reservoir 205 connected to the rear-wheel-side master cylinder 203, a rear-wheel-side switching valve 207 connected to the rear-wheel-side master cylinder 203 via a pipeline 204, and a rear-wheel-side high-pressure intake valve 209 connected to the rear-wheel-side master cylinder 203 via the pipeline 204. A filter is provided in a connection between the pipeline 204 and the rear-wheel-side switching valve 207, and in a connection between the pipeline 204 and the rear-wheel-side high-pressure intake valve 209. Furthermore, a pressure sensor 211 is provided for the pipeline 204. The pressure sensor 211 detects pressure between the rear-wheel-side master cylinder 203 and the rear-wheel-side switching valve 207, and pressure between the master cylinder 203 and the rear-wheel-side high-pressure intake valve 209, and transmits each pressure signal to the ECU 400.

A rear-wheel-side inlet valve 213 is connected to the rear-wheel-side switching valve 207 via a pipeline 206. A filter is provided even in a connection between the rear-wheel-side switching valve 207 and the pipeline 206, and in a connection between the rear-wheel-side inlet valve 213 and the pipeline 206. The rear-wheel-side inlet valve 213 is connected to a rear-wheel-side caliper 215 via a pipeline 214. A rear-wheel brake is configured of the rear-wheel-side caliper 215. The rear-wheel-side caliper 215 is connected to the rear-wheel-side inlet valve 213 via the pipeline 214 as described before.

On the other hand, the pipeline 206 is connected with a discharge side of a rear-wheel-side hydraulic pump 219 via a choke. A suction side of the rear-wheel-side hydraulic pump 219 is connected to a pipeline 220 via a filter. The rear-wheel-side hydraulic pump 219 is driven by the DC motor 300. The pipeline 220 is connected with one end of a rear-wheel-side check valve 221. Furthermore, the pipeline 220 is connected with a discharge port of the rear-wheel-side high-pressure intake valve 209. The other end of the rear-wheel-side check valve 221 is connected to a pipeline 222. The rear-wheel-side check valve 221 is disposed to prevent backflow from the pipeline 220 to the pipeline 222.

The pipeline 222 is connected with a discharge port of a rear-wheel-side outlet valve 223. Furthermore, the pipeline 222 is connected with a rear-wheel-side reservoir (accumulator) 225 between the rear-wheel-side check valve 221 and the rear-wheel-side outlet valve 223.

The rear-wheel-side caliper 215 is connected with an inflow port of the rear-wheel-side outlet valve 223 via the pipeline 214. An outflow port of the rear-wheel-side outlet valve 223 is connected to the pipeline 222. A filter is provided in a connection between an outflow port of the rear-wheel-side outlet valve 223 and the pipeline 214. A pressure sensor 227 is provided for the pipeline 214. The pressure sensor 227 measures pressure in the pipeline 214, and transmits a pressure signal to the ECU 400.

Figure 2:
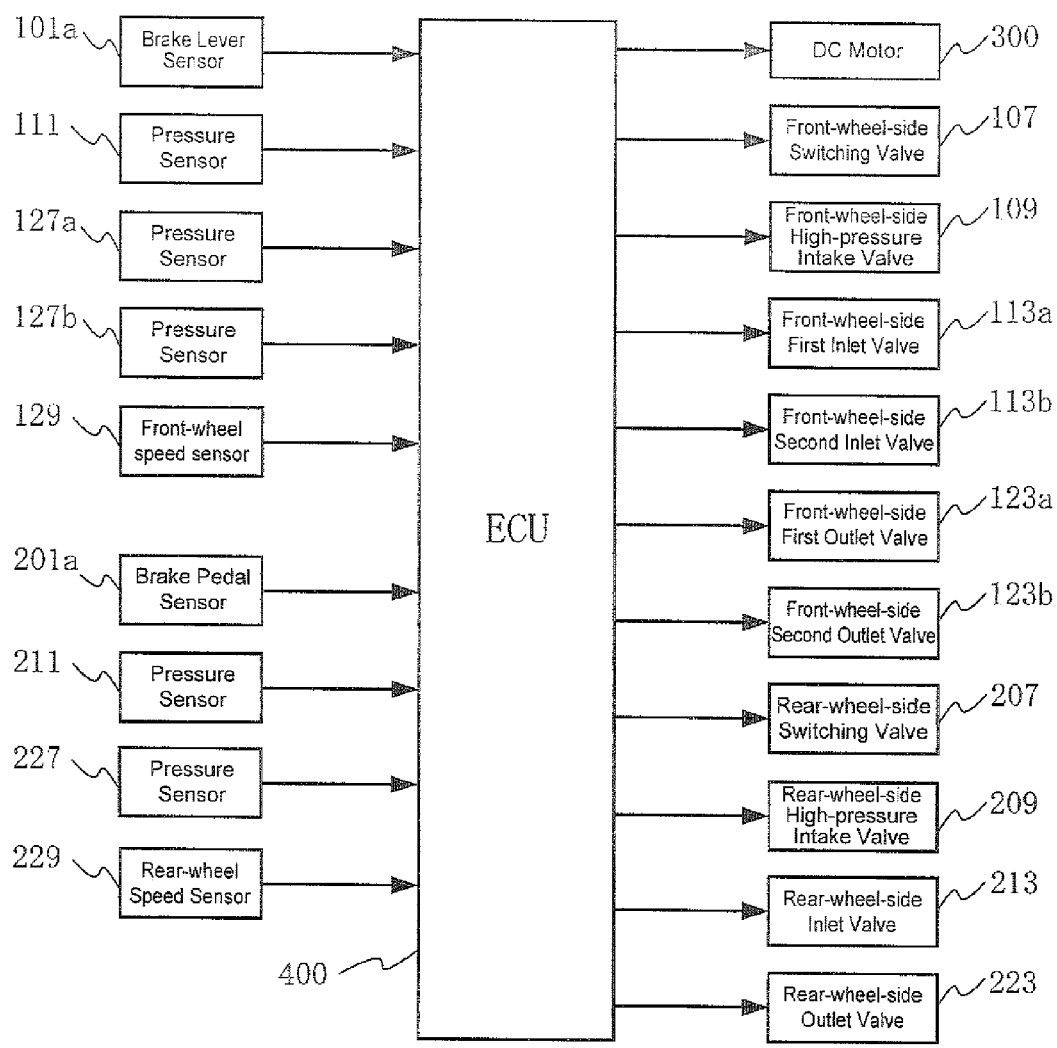
FIG. 2 is a block diagram of the braking control system of FIG. 1.

The hydraulic circuit shown in FIG. 1 is controlled by the electronic control unit (ECU) 400 shown in a block diagram of FIG. 2. The ECU 400 is connected with a brake lever sensor 101a provided in the brake lever 101, the pressure sensors 111, 127a and 127b, and a front-wheel speed sensor 129 detecting rotational speed of a front wheel. The brake lever sensor 101a transmits an operational signal of the brake lever 101 to the ECU 400, the pressure sensors 111, 127a and 127b transmit signals of pressure in the pipelines 104, 114a and 114b to the ECU 400 respectively, and the front-wheel speed sensor 129 transmits a rotational speed signal of a front wheel to the ECU 400. Furthermore, the ECU 400 is connected with a brake pedal sensor 201a provided in the brake pedal 201, the pressure sensors 211 and 227, and a rear-wheel speed sensor 229 detecting rotational speed of a rear wheel. The brake pedal sensor 201 transmits an operational signal of the brake pedal 201 to the ECU 400, the pressure sensors 211 and 227 transmit signals of pressure in the pipelines 204 and 214 to the ECU 400 respectively, and the rear-wheel speed sensor 229 transmits a rotational speed signal of a rear wheel to the ECU 400.

In addition, the ECU 400 actuates each of the DC motor 300, the front-wheel-side switching valve 107, the front-wheel-side high-pressure intake valve 109, the front-wheel-side first inlet valve 113a, the front-wheel-side second inlet valve 113b, the front-wheel-side first outlet valve 123a, and the front-wheel-side second outlet valve 123b according to a predetermined condition based on the operational signal, the pressure signals, and the speed signal. Furthermore, the ECU 400 actuates each of the rear-wheel-side switching valve 207, the rear-wheel-side high-pressure intake valve 209, the rear-wheel-side inlet valve 213, and the rear-wheel-side outlet valve 223 according to a predetermined condition based on the operational signal, the pressure signals, and the speed signal. Each of the valves is an electromagnetic valve having a solenoid, and changed in opening/closing state upon current application by the ECU 400.

Furthermore, when the ECU 400 receives a rotational speed signal from the front-wheel speed sensor 129 or the rear-wheel speed sensor 229 and thus detects wheel lock during braking, the ECU 400 actuates an anti-lock braking system (ABS) so that the respective hydraulic pumps are actuated to open or close respective valves, so that braking force is controlled so as to prevent wheel lock.

Operation of the hydraulic circuit of the first embodiment is described in each of a normal-brake-operable condition and an interlocked-brake-operable condition. An opening/closing state of each valve shown in FIG. 1 corresponds to the normal-brake-operable condition.

First, description is made on a case that the brake lever 101 and the brake pedal 201 are operated at the same time. In the front-wheel hydraulic circuit 100, the brake lever 101 is operated so that the front-wheel-side master cylinder 103 is actuated and hydraulic pressure in the pipeline 104 is increased. Since the front-wheel-side switching valve 107, the front-wheel-side first inlet valve 113a, and the front-wheel-side second inlet valve 113b are opened as shown in FIG. 1, the hydraulic pressure in the pipeline 104 is applied to the front-wheel-side first caliper 115a and the front-wheel-side second caliper 115b via the front-wheel-side switching valve 107, the pipeline 106, the front-wheel-side first inlet valve 113a and the front-wheel-side second inlet valve 113b, and the pipelines 114a and 114b, so that the front-wheel-side first caliper 115a and the front-wheel-side second caliper 115b are actuated, leading to braking of a front wheel by the front-wheel brake.

Similarly, in the rear-wheel hydraulic circuit 200, the brake pedal 201 is operated so that the rear-wheel-side master cylinder 203 is actuated and hydraulic pressure in the pipeline 204 is increased. Since the rear-wheel-side switching valve 207 and the rear-wheel-side inlet valve 213 are opened as shown in FIG. 1, the hydraulic pressure in the pipeline 204 is applied to the rear-wheel-side caliper 215 via the rear-wheel-side switching valve 207, the pipeline 206, the rear-wheel-side inlet valve 213, and the pipeline 214, so that the rear-wheel-side caliper 215 is actuated, leading to braking of a rear wheel by the rear-wheel brake.

In the case that the ECU 400 determines that a ratio in brake force between front and rear wheels does not correspond to a predetermined, appropriate ratio based on operational signals from the brake lever sensor 101a and the brake pedal sensor 201a, the ECU 400 actuates the front-wheel-side hydraulic pump 119 or the rear-wheel-side hydraulic pump 219 by the DC motor 300 to allow active pressure build-up in the front-wheel hydraulic circuit 100 or the rear-wheel hydraulic circuit 200, so that the ratio in brake force between the front and rear wheels is adjusted to an appropriate ratio. As the appropriate ratio in braking force between the front and rear wheels, for example, a ratio shown in FIG. 2 in JP-A-2000-71963 may be used.

Next, to describe a feature of the braking control system of the invention, description is made on a case that the brake pedal 201 is operated, and the brake lever 101 is not operated. When the brake pedal 201 is pressed on, hydraulic pressure in the rear-wheel-side master cylinder 203 is raised, and the raised hydraulic pressure is applied to the rear-wheel caliper 215 via the pipeline 204, the rear-wheel-side switching valve 207 being opened, the pipeline 206, the rear-wheel-side inlet valve 213 being opened, and the pipeline 214 in sequence, thereby the rear-wheel caliper 215 is actuated and the rear wheel is braked.

In the case that the ECU 400 determines that the brake lever 101 is not operated based on a detection signal from the brake lever sensor 101a, a control mode is shifted to a front-and-rear-wheel-interlocked control mode. In the front-and-rear-wheel-interlocked control mode, the ECU 400 allows active pressure increase in the front-wheel hydraulic circuit 100 so that braking is performed in a front wheel side.

Specifically, while the ECU 400 closes the front-wheel-side switching valve 107, and opens the front-wheel-side high-pressure intake valve 109, the ECU keeps the front-wheel-side first inlet valve 113a to be opened, and closes the front-wheel-side second inlet valve 113b so as to actuate the front-wheel-side hydraulic pump 119 by the DC motor 300. Upon actuation of the front-wheel-side hydraulic pump 119, braking liquid from the front-wheel-side master-cylinder reservoir 105 is sucked into a suction port of the front-wheel-side hydraulic pump 119 through the pipeline 104, the frontwheel-side high-pressure intake valve 109, and the pipeline 120. Then, the braking liquid is discharged from the discharge port of the front-wheel-side hydraulic pump 119, so that hydraulic pressure in the pipeline 106 is raised. Since the front-wheel-side switching valve 107 and the front-wheel-side second inlet valve 113*b* are closed, the raised hydraulic pressure in the pipeline 106 is applied to the front-wheel-side first caliper 115*a* via the front-wheel-side first inlet valve 113*a* and the pipeline 114*a*, so that only the front-wheel-side first caliper 115*a* is actuated, and consequently the front-wheel is braked with a predetermined appropriate braking force value.

In the past, when a driver operates the brake lever 101 in this situation, since hydraulic pressure in the pipeline 104 is also raised due to the active pressure increase in the front-wheel hydraulic circuit 100, unpleasantness has been felt in operation feeling of the brake lever 101. On the other hand, in the invention, while the front-wheel hydraulic circuit 100 is subjected to active pressure increase and thus only the front-wheel-side first caliper 115*a* is actuated as above, when a driver operates the brake lever 101, the brake lever sensor 101*a* detects presence of operation of the brake lever 101, and transmits a detection signal to the ECU 400. In the case that only the front-wheel-side first caliper 115*a* operates, when the ECU 400 detects presence of operation of the brake lever 101 by the brake lever sensor 101*a*, the ECU 400 opens the front-wheel-side second inlet valve 113*b* that has been closed while the front-wheel-side high-pressure intake valve 109 is kept to be opened, and the front-wheel-side switching valve 107 is kept to be closed. The reason why the front-wheel-side high-pressure intake valve 109 is kept to be opened is because if the front-wheel-side high-pressure intake valve 109 is closed in this situation, active pressure increase is stopped, and pressure is momentarily escaped to the opened circuit, therefore input from the brake lever 101 may not follow such change in pressure, leading to a possibility of pressure-lost feeling in operation of the brake lever 101.

The front-wheel-side second inlet valve 113*b* is opened, thereby the brake lever 101 may be smoothly operated, so that hydraulic pressure in the front-wheel-side master cylinder 103 is applied to the front-wheel-side second caliper 115*b* via the pipeline 104, the front-wheel-side high-pressure intake valve 109, the pipeline 120, the front-wheel-side hydraulic pump 119, the pipeline 106, the front-wheel-side second inlet valve 113*b*, and the pipeline 114*b*, consequently the front-wheel-side second caliper 115*b* is operated. In this way, operation feeling of the brake lever 101 may be improved. In such control, when the front-wheel hydraulic circuit 100 is subjected to active pressure increase, only the front-wheel-side second inlet valve 113*b* operates along with operation of the brake lever 101, and therefore the front-wheel-side second inlet valve 113*b* can be interlocked with operation of the brake lever 101, leading to easy control of valve operation timing compared with a case that a plurality of valves are controlled in opening/closing.

In the description, the front-wheel-side first caliper 115*a* is used for active pressure increase. However, the front-wheel-side second caliper 115*b* may be used for active pressure increase. In this case, when the front-wheel hydraulic circuit 100 is subjected to active pressure increase, the front-wheel-side second inlet valve 113*b* is opened, and the front-wheel-side first inlet valve 113*a* is closed, and when the brake lever 101 is operated, the front-wheel-side first inlet valve 113*a* is opened.

When one of the front-wheel-side first caliper 115*a* and the front-wheel-side second caliper 115*b* is always used for active pressure increase, and the other is always used for manual operation, a brake pad is eccentrically worn. Thus, the two calipers on a front wheel side are used for active pressure increase while being alternately changed according to a beforehand determined condition, for example, alternately changed for each braking operation. Alternatively, a caliper used for active pressure increase may be changed during performing no braking operation after running for a certain time or after running for a certain distance. The reason for changing a caliper during performing no braking operation is that if a caliper is changed during performing braking operation, a front wheel may not be appropriately braked. Therefore, such caliper change is appropriately performed under a condition that braking operation is not performed.

The invention may be applied to a scooter where right and left levers are used for braking of front and rear wheels. In this case, the same hydraulic circuit as the front-wheel hydraulic circuit 100 is used as a rear-wheel hydraulic circuit in place of the rear-wheel hydraulic circuit 200. Thus, operation feeling of right and left brake levers may be improved.

[Second Embodiment]

Figure 3:
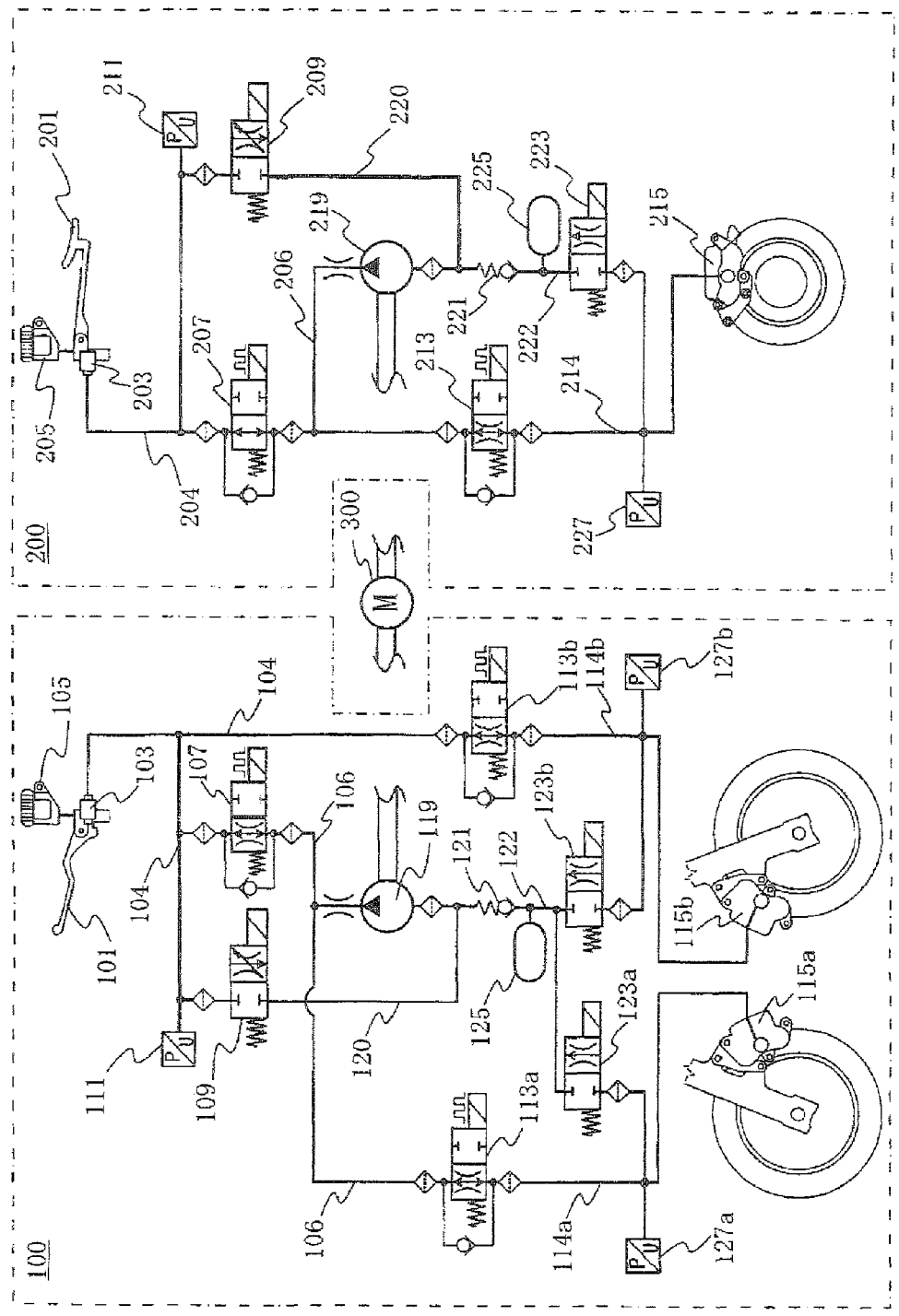
FIG. 3 is a hydraulic circuit diagram used for a braking control system of a second embodiment of the invention.

FIG. 3 shows a hydraulic circuit of a braking control system according to a second embodiment of the invention. The hydraulic circuit is configured of a front-wheel hydraulic circuit 100, a rear-wheel hydraulic circuit 200, and a DC motor 300 for driving respective hydraulic pumps in the front-wheel hydraulic circuit 100 and the rear-wheel hydraulic circuit 200.

First, a configuration of the front-wheel hydraulic circuit 100 is described. The front-wheel hydraulic circuit 100 has a brake lever 101 to be operated by a right hand of a driver, a front-wheel-side master cylinder 103 to be pressurized upon operation of the brake lever 101, a front-wheel-side master cylinder reservoir 105 connected to the front-wheel-side master cylinder 103, a front-wheel-side switching valve 107 connected to the front-wheel-side master cylinder 103 via a pipeline 104, and a front-wheel-side intake valve 109 connected to the front-wheel-side master cylinder 103 via the pipeline 104. A filter is provided in a connection between the pipeline 104 and the front-wheel-side switching valve 107, and in a connection between the pipeline 104 and the front-wheel-side intake valve 109. Furthermore, a pressure sensor 111 is provided for the pipeline 104. The pressure sensor 111 detects pressure between the front-wheel-side master cylinder 103 and the front-wheel-side switching valve 107, and pressure between the master cylinder 103 and the front-wheel-side intake valve 109, and transmits each pressure signal to an electronic control unit ECU 400 described later.

A front-wheel-side first inlet valve 113*a* is connected to the front-wheel-side switching valve 107 via a pipeline 106. A filter is provided even in a connection between the front-wheel-side switching valve 107 and the pipeline 106, and in a connection between the front-wheel-side first inlet valve 113*a* and the pipeline 106. The front-wheel-side first inlet valve 113*a* is connected to a front-wheel-side first caliper 115*a* via a pipeline 114*a*.

On the other hand, a front-wheel-side second inlet valve 113*b* is directly connected to the pipeline 104. A filter is provided even in a connection between the front-wheel-side second inlet valve 113*b* and the pipeline 104. The front-wheel-side second inlet valve 113*b* is connected to a front-wheel-side second caliper 115*b* via a pipeline 114*b*.

The braking control system of the invention is connected to a front-wheel brake to be actuated by the front-wheel hydraulic circuit 100. The front-wheel brake is configured of the front-wheel-side first caliper 115*a* (front-wheel interlocked brake) and the front-wheel-side second caliper 115*b* (front-wheel non-interlocked brake).

The front-wheel-side first caliper 115a is connected to the front-wheel-side first inlet valve 113a via the pipeline 114a as described above. The front-wheel-side second caliper 115b is connected to the front-wheel-side second inlet valve 113b via the pipeline 114b as described above.

On the other hand, the pipeline 106 is connected with a discharge side of a front-wheel-side hydraulic pump 119 via a choke. A suction side of the front-wheel-side hydraulic pump 119 is connected to a pipeline 120 via a filter. The front-wheel-side hydraulic pump 119 is driven by the DC motor 300. The pipeline 120 is connected with one end of a front-wheel-side first check valve 121. Furthermore, the pipeline 120 is connected with a discharge port of the front-wheel-side intake valve 109. The other end of the front-wheel-side first check valve 121 is connected to a pipeline 122. The front-wheel-side first check valve 121 is disposed to prevent backflow from the pipeline 120 to the pipeline 122.

The front-wheel-side first caliper 115a is connected with an inflow end of a front-wheel-side first outlet valve 123a via the pipeline 114a. An outflow port of the front-wheel-side first outlet valve 123a is connected to the pipeline 122. A filter is provided in a connection between an inflow port of the front-wheel-side first outlet valve 123a and the pipeline 114a. A pressure sensor 127a is provided for the pipeline 114a. The pressure sensor 127a measures pressure in the pipeline 114a, and transmits a pressure signal to the ECU 400.

The front-wheel-side second caliper 115b is connected with an inflow port of a front-wheel-side second outlet valve 123b via the pipeline 114b. An outflow port of the front-wheel-side second outlet valve 123b is connected to the pipeline 122. A filter is provided in a connection between an inflow port of the front-wheel-side second outlet valve 123b and the pipeline 114b. A pressure sensor 127b is provided for the pipeline 114b. The pressure sensor 127b measures pressure in the pipeline 114b, and transmits a pressure signal to the ECU 400. Pressure in the pipeline 114b is not higher than pressure in the pipeline 114a. In addition, since pressure in the pipeline 114a is detected by the pressure sensor 127a, the pressure sensor 127b may be omitted.

Next, a configuration of the rear-wheel hydraulic circuit 200 is described using FIG. 3. The rear-wheel hydraulic circuit 200 has a brake pedal 201 to be operated by a right foot of a driver, a rear-wheel-side master cylinder 203 to be pressurized upon operation of the brake pedal 201, a rear-wheel-side master cylinder reservoir 205 connected to the rear-wheel-side master cylinder 203, a rear-wheel-side switching valve 207 connected to the rear-wheel-side master cylinder 203 via a pipeline 204, and a rear-wheel-side intake valve 209 connected to the rear-wheel-side master cylinder 203 via the pipeline 204. A filter is provided in a connection between the pipeline 204 and the rear-wheel-side switching valve 207, and in a connection between the pipeline 204 and the rear-wheel-side intake valve 209. Furthermore, a pressure sensor 211 is provided for the pipeline 204. The pressure sensor 211 detects pressure between the rear-wheel-side master cylinder 203 and the rear-wheel-side switching valve 207, and pressure between the master cylinder 203 and the rear-wheel-side intake valve 209, and transmits each pressure signal to the ECU 400.

A rear-wheel-side inlet valve 213 is connected to the rear-wheel-side switching valve 207 via a pipeline 206. A filter is provided even in a connection between the rear-wheel-side switching valve 207 and the pipeline 206, and a connection between the rear-wheel-side inlet valve 213 and the pipeline 206. The rear-wheel-side inlet valve 213 is connected to a rear-wheel-side caliper 215 via a pipeline 214. A rear-wheel brake is configured of the rear-wheel-side caliper 215. The rear-wheel-side caliper 215 is connected to the rear-wheel-side inlet valve 213 via the pipeline 214 as described before.

On the other hand, the pipeline 206 is connected with a discharge side of a rear-wheel-side hydraulic pump 219 via a choke. A suction side of the rear-wheel-side hydraulic pump 219 is connected to a pipeline 220 via a filter. The rear-wheel-side hydraulic pump 219 is driven by the DC motor 300. The pipeline 220 is connected with one end of a rear-wheel-side check valve 221. Furthermore, the pipeline 220 is connected with a discharge port of the rear-wheel-side intake valve 209. The other end of the rear-wheel-side check valve 221 is connected to a pipeline 222. The rear-wheel-side check valve 221 is disposed to prevent backflow from the pipeline 220 to the pipeline 222.

The pipeline 222 is connected with a discharge port of a rear-wheel-side outlet valve 223. Furthermore, the pipeline 222 is connected with a rear-wheel-side reservoir (accumulator) 225 between the rear-wheel-side check valve 221 and the rear-wheel-side outlet valve 223.

The rear-wheel-side caliper 215 is connected with an inflow port of the rear-wheel-side outlet valve 223 via the pipeline 214. An outflow port of the rear-wheel-side outlet valve 223 is connected to the pipeline 222. A filter is provided in a connection between an outflow port of the rear-wheel-side outlet valve 223 and the pipeline 214. A pressure sensor 227 is provided for the pipeline 214. The pressure sensor 227 measures pressure in the pipeline 214, and transmits a pressure signal to the ECU 400.

Figure 4:
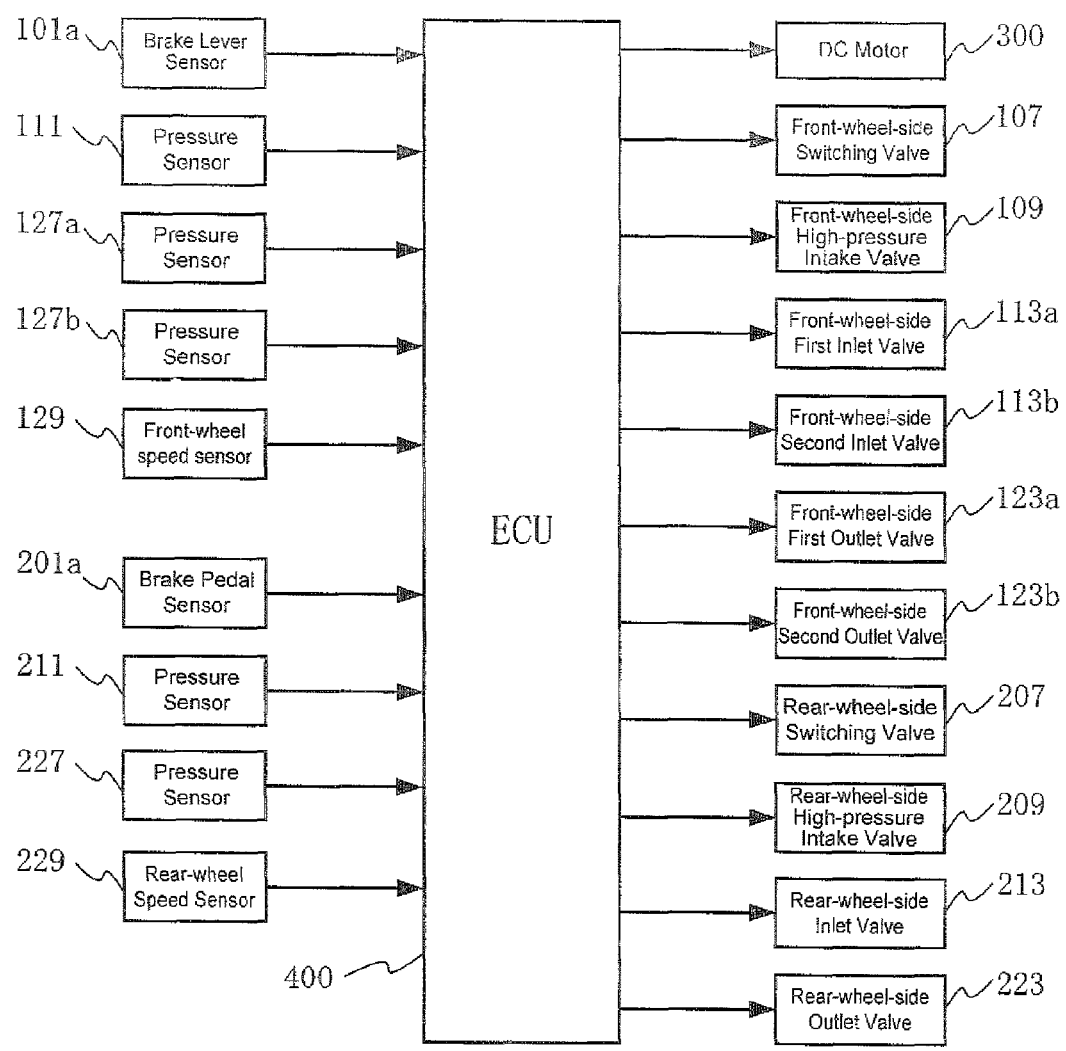
FIG. 4 is a block diagram of the braking control system of FIG. 3.

The hydraulic circuit shown in FIG. 3 is controlled by the electronic control unit (ECU) 400 shown in a block diagram of FIG. 4. The ECU 400 is connected with a brake lever sensor 101a provided in the brake lever 101, the pressure sensors 111, 127a and 127b, and a front-wheel speed sensor 129 detecting rotational speed of a front wheel. The brake lever sensor 101a transmits an operational signal of the brake lever 101 to the ECU 400, the pressure sensors 111, 127a and 127b transmit signals of pressure in the pipelines 104, 114a and 114b to the ECU 400 respectively, and the front-wheel speed sensor 129 transmits a rotational speed signal of a front wheel to the ECU 400. Furthermore, the ECU 400 is connected with a brake pedal sensor 201a provided in the brake pedal 201, the pressure sensors 211 and 227, and a rear-wheel speed sensor 229 detecting rotational speed of a rear wheel. The brake pedal sensor 201a transmits an operational signal of the brake pedal 201 to the ECU 400, the pressure sensors 211 and 227 transmit signals of pressure in the pipelines 204 and 214 to the ECU 400 respectively, and the rear-wheel speed sensor 229 transmits a rotational speed signal of a rear wheel to the ECU 400.

In addition, the ECU 400 actuates each of the DC motor 300, the front-wheel-side switching valve 107, the front-wheel-side intake valve 109, the front-wheel-side first inlet valve 113a, the front-wheel-side second inlet valve 113b, the front-wheel-side first outlet valve 123a, and the front-wheel-side second outlet valve 123b according to a predetermined condition based on the operational signal, the pressure signals, and the speed signal. Furthermore, the ECU 400 actuates each of the rear-wheel-side switching valve 207, the rear-wheel-side intake valve 209, the rear-wheel-side inlet valve 213, and the rear-wheel-side outlet valve 223 according to a predetermined condition based on the operational signal, the pressure signals, and the speed signal. Each of the valves is an electromagnetic valve having a solenoid, and changed in opening/closing state upon current application by the ECU 400.

Furthermore, when the ECU 400 receives a rotational speed signal from the front-wheel speed sensor 129 or the rear-wheel speed sensor 229 and thus detects wheel lock during braking, the ECU 400 actuates an anti-lock braking system (ABS) so that the respective hydraulic pumps are actuated to open or close respective valves, so that braking force is controlled to prevent wheel lock.

Operation of the hydraulic circuit of the second embodiment is described in respective operations of a first operation where the brake pedal 201 and the brake lever 101 are sequentially operated, and a second operation where the brake lever 101 and the brake pedal 201 are sequentially operated. An opening/closing state of each valve shown in FIG. 3 shows a condition where both of the brake pedal 201 and the brake lever 101 are not operated.

First, the first operation is described, where the brake pedal 201 is first operated in a rear wheel side, and then the brake lever 101 is operated in a front wheel side. When the brake pedal 201 is first pressed on, hydraulic pressure in the rear-wheel-side master cylinder 203 is raised, and the raised hydraulic pressure is applied to the rear-wheel caliper 215 via the pipeline 204, the rear-wheel-side switching valve 207 being opened, the pipeline 206, the rear-wheel-side inlet valve 213 being opened, and the pipeline 214 in sequence, thereby the rear-wheel caliper 215 is actuated and the rear wheel is braked.

The ECU 400 detects presence of operation of the brake pedal 201 by the pressure sensor 211 in the rear-wheel hydraulic circuit 200, and detects pressure in the pipeline 214 (input braking pressure applied to the rear-wheel-side caliper 215) by the pressure sensor 227. In this situation, when the ECU 400 determines that the brake lever 101 is not operated based on a detection signal from the pressure sensor 111 in the front-wheel hydraulic circuit 100, a control mode is shifted to a front-and-rear-wheel-interlocked control mode. In the front-and-rear-wheel-interlocked control mode, the ECU 400 allows active pressure increase in the front-wheel hydraulic circuit 100, so that a front wheel is braked with an appropriate braking force value. As the appropriate ratio in braking force between the front and rear wheels, for example, a ratio shown in FIG. 4 in JP-A-2000-71963 may be used.

Specifically, while the ECU 400 closes the front-wheel-side switching valve 107, and opens the front-wheel-side intake valve 109, the ECU controls opening/closing of the front-wheel-side first inlet valve 113a, and actuates the front-wheel-side hydraulic pump 119 by the DC motor 300. Upon actuation of the front-wheel-side hydraulic pump 119, braking liquid is sucked out from the front-wheel-side master cylinder reservoir 105 via the pipeline 104 and the front-wheel-side intake valve 109, and sucked into a suction port of the front-wheel-side hydraulic pump 119 through the pipeline 120. Then, the braking liquid is discharged from the discharge port of the front-wheel-side hydraulic pump 119, so that hydraulic pressure in the pipeline 106 is raised. Since the front-wheel-side switching valve 107 is closed, the raised hydraulic pressure in the pipeline 106 is applied to the front-wheel-side first caliper 115a via the front-wheel-side first inlet valve 113a and the pipeline 114a, so that only the front-wheel-side first caliper 115a is actuated, and consequently the front-wheel is braked with a predetermined appropriate braking force value. On the other hand, during such pressure increase, while the front-wheel-side second inlet valve 113b is kept opened, the front-wheel-side switching valve 107 is closed, therefore pressure in the pipeline 114b is not raised, and consequently the front-wheel-side second caliper 115b is not actuated.

In the past, when a driver operates the brake lever 101 in a front wheel side in this situation, since hydraulic pressure in the pipeline 104 is also raised due to the pressure increase in the front-wheel hydraulic circuit 100, unpleasantness has been felt in operation feeling of the brake lever 101. On the other hand, in the invention, while the front-wheel hydraulic circuit 100 is increased in pressure and thus only the front-wheel-side first caliper 115a is actuated as above, when a driver operates the brake lever 101, an opening/closing state of each valve is not changed in the above pressure-increased condition, that is, the front-wheel-side second inlet valve 113b is kept to be opened, therefore hydraulic pressure in the front-wheel-side master cylinder 103 is directly applied to the front-wheel-side second caliper 115b via the pipeline 104, the front-wheel-side second inlet valve 113b, and the pipeline 114b, so that the front-wheel-side second caliper 115b is actuated. In this way, when the front-wheel-side second caliper 115b operates, it is not necessary to detect presence of operation of the brake lever 101 for opening or closing a valve. Therefore, a time lag causing unpleasantness does not occur between operation timing of the brake lever 101 and actuation timing of the front-wheel-side second caliper 115b, leading to natural operation feeling of the brake lever 101.

In addition, in the invention, since the hydraulic circuit in a side of the front-wheel-side first caliper 115a (front-wheel interlocked brake) is separated from the hydraulic circuit in a side of the front-wheel-side second caliper 115b (front-wheel non-interlocked brake) in the front-wheel hydraulic circuit 100, when the front-wheel hydraulic circuit 100 is increased in pressure, only the pipeline 106, pipeline 114a and front-wheel-side first caliper 115a are increased in pressure in the front-wheel-side first caliper 115a side, and the pipeline 114b and the front-wheel-side second caliper 115b are not increased in pressure in the front-wheel-side second caliper 115b side. Such a circuit configuration reduces volume of a portion in a side being increased in pressure by the front-wheel-side hydraulic pump 119, leading to a further advantage that a response characteristic of the front-wheel-side first caliper 115a is improved during pressure increase.

At the end of the first operation, that is, at a point when the brake pedal 201 is operated in the rear wheel side, and then the brake lever 101 is operated in the front wheel side, when the ECU 400 determines that braking pressure applied to the rear-wheel caliper 215 (detection pressure of the pressure sensor 227) has reached the rear-wheel-side target braking pressure with respect to larger one of input pressure to the front-wheel-side first caliper 115a and input pressure to the front-wheel-side second caliper 115b (larger one of detection pressure of the pressure sensor 127a and detection pressure of the pressure sensor 127b), the ECU 400 does not allow active pressure increase in the rear-wheel-side caliper 215. Then, when detection pressure of the front-wheel-side first caliper 115a or the front-wheel-side second caliper 115b is raised, the ECU 400 selects a larger pressure value for the rear-wheel-side target braking pressure. In this situation, the ECU 400 determines that pressure of the rear-wheel-side caliper 215 becomes insufficient, and allows active pressure increase in the rear-wheel-side caliper 215.

Next, the second operation is described, where the brake lever 101 is first operated in the front wheel side, and then the brake pedal 201 is operated in the rear wheel side.

First, when the brake lever 101 is operated, upon operation of the brake lever 101, hydraulic pressure is raised in each of the front-wheel-side master cylinder 103 and the pipeline 104 in the front-wheel hydraulic circuit 100. Since the front-wheel-side switching valve 107, the front-wheel-side first inlet valve 113a, and the front-wheel-side second inlet valve 113b are opened as shown in FIG. 3, hydraulic pressure in the pipeline 104 is applied to the front-wheel-side first caliper 115a via the front-wheel-side switching valve 107, the pipeline 106, the front-wheel-side first inlet valve 113a, and the pipeline 114a, so that the front-wheel-side first caliper 115a is actuated. On the other hand, hydraulic pressure in the pipeline 104 is applied to the front-wheel-side second caliper 115b via the front-wheel-side second inlet valve 113b and the pipeline 114b, so that the front-wheel-side second caliper 115b is actuated. Consequently, the front wheel is braked by both of the front-wheel-side first caliper 115a and the front-wheel-side second caliper 115b.

The ECU 400 detects presence of operation of the brake lever 101 by the pressure sensor 111 in the front-wheel hydraulic circuit 100, and detects pressure in each of the pipelines 114a and 114b (input braking pressure applied to each of the front-wheel-side first caliper 115a and the front-wheel-side second caliper 115b) by the pressure sensors 127a and 127b. In this situation, when the ECU 400 determines that the brake pedal 201 is not operated based on a detection signal from the pressure sensor 211 in the rear-wheel hydraulic circuit 200, a control mode is shifted to a front-and-rear-wheel-interlocked control mode. In the front-and-rear-wheel-interlocked control mode, the ECU 400 allows active pressure increase in the rear-wheel hydraulic circuit 200, so that a rear wheel is braked with an appropriate braking force value.

Specifically, while the ECU 400 closes the rear-wheel-side switching valve 207, and opens the rear-wheel-side intake valve 209, the ECU controls opening/closing of the rear-wheel-side inlet valve 213, and actuates the rear-wheel-side hydraulic pump 219 by the DC motor 300. Upon actuation of the rear-wheel-side hydraulic pump 219, braking liquid is sucked out from the rear-wheel-side master cylinder reservoir 205 via the pipeline 204 and the rear-wheel-side intake valve 209, and discharged from the discharge port of the rear-wheel-side hydraulic pump 219 through the pipeline 220, so that hydraulic pressure in the pipeline 206 is raised. Since the rear-wheel-side switching valve 207 is closed, the raised hydraulic pressure in the pipeline 206 is applied to the rear-wheel-side caliper 215 via the rear-wheel-side inlet valve 213, so that the rear-wheel-side caliper 215 is actuated, and consequently the rear-wheel is braked with a predetermined appropriate braking force value.

At the end of the second operation, that is, at a point when the brake lever 101 is operated in the front wheel side, and then the brake pedal 201 is operated in the rear wheel side, when the ECU 400 determines that braking pressure applied to one of the front-wheel-side first caliper 115a and the front-wheel-side second caliper 115b (detection pressure of the pressure sensor 127a or the pressure sensor 127b) has reached the front-wheel-side target braking pressure with respect to braking pressure of the rear-wheel-side caliper 215 (detection pressure of the pressure sensor 227), the ECU 400 does not allow active pressure increase in the front-wheel-side first caliper 115a. Then, when detection pressure of the rear-wheel caliper 215 is raised, the ECU 400 selects a larger pressure value for the front-wheel-side target braking pressure. In this situation, the ECU 400 determines that pressure of one of the front-wheel-side first caliper 115a and the front-wheel-side second caliper 115b becomes insufficient, and allows active pressure increase in the front-wheel-side first caliper 115a.

In the description of operation of the hydraulic circuit, a signal on presence of operation of the brake lever 101 or the brake pedal 201, the signal being necessary for active pressure increase, is a signal from the pressure sensor 111 detecting hydraulic pressure in the front-wheel-side master cylinder 103, or a signal from the pressure sensor 211 detecting hydraulic pressure in the rear-wheel-side master cylinder 203, and a signal from the brake lever sensor 101a or a signal from the brake pedal sensor 201a are used as a backup signal for the signal from the pressure sensor 111 or 211. The backup signal means a signal for operation that when the ECU 400 determines that the pressure sensor 111 or 211 is failed, the ECU 400 allows active pressure increase in a portion at an interlocked side according to an operational signal from the brake lever 101 or the brake pedal 201.

[Third Embodiment]

Figure 5:
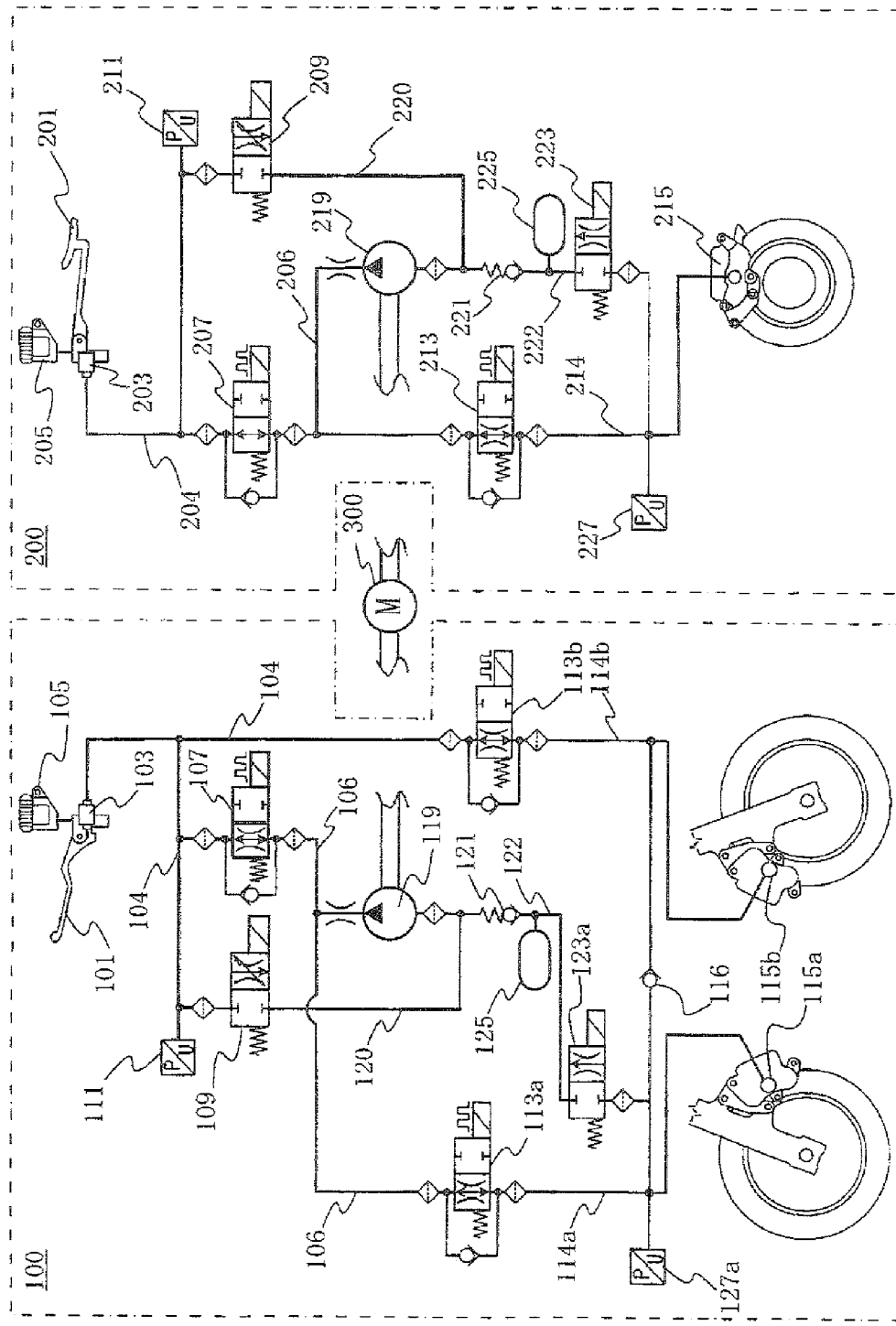
FIG. 5 is a hydraulic circuit diagram used for a braking control system of a third embodiment of the invention.

FIG. 5 shows a hydraulic circuit of a braking control system according to a third embodiment of the invention. The hydraulic circuit is configured of a front-wheel hydraulic circuit 100, a rear-wheel hydraulic circuit 200, and a DC motor 300 for driving respective hydraulic pumps in the front-wheel hydraulic circuit 100 and the rear-wheel hydraulic circuit 200.

First, a configuration of the front-wheel hydraulic circuit 100 is described. The front-wheel hydraulic circuit 100 has a brake lever 101 to be operated by a right hand of a driver, a front-wheel-side master cylinder 103 to be pressurized upon operation of the brake lever 101, a front-wheel-side master cylinder reservoir 105 connected to the front-wheel-side master cylinder 103, a front-wheel-side switching valve 107 connected to the front-wheel-side master cylinder 103 via a pipeline 104, and a front-wheel-side intake valve 109 connected to the front-wheel-side master cylinder 103 via the pipeline 104. A filter is provided in a connection between the pipeline 104 and the front-wheel-side switching valve 107, and in a connection between the pipeline 104 and the front-wheel-side intake valve 109. Furthermore, a pressure sensor 111 is provided for the pipeline 104. The pressure sensor 111 detects pressure between the front-wheel-side master cylinder 103 and the front-wheel-side switching valve 107, and pressure between the master cylinder 103 and the front-wheel-side intake valve 109, and transmits each pressure signal to an electronic control unit (ECU) 400 described later.

A front-wheel-side first inlet valve 113a is connected to the front-wheel-side switching valve 107 via a pipeline 106. A filter is provided even in a connection between the front-wheel-side switching valve 107 and the pipeline 106, and in a connection between the front-wheel-side first inlet valve 113a and the pipeline 106. The front-wheel-side first inlet valve 113a is connected to a front-wheel-side first caliper 115a via a pipeline 114a.

On the other hand, a front-wheel-side second inlet valve 113b is directly connected to the pipeline 104. A filter is provided even in a connection between the front-wheel-side second inlet valve 113b and the pipeline 104. The front-wheel-side second inlet valve 113b is connected to a front-wheel-side second caliper 115b via a pipeline 114b. Furthermore, the pipeline 114a is connected to the pipeline 114b via a front-wheel-side second check valve (front-wheel-side second backflow-check-means) 116. The front-wheel-side second check valve 116 is disposed to allow flow of braking liquid from a pipeline 114b side to a pipeline 114a side, and prevent backflow from the pipeline 114a side to the pipeline 114b side. Therefore, in the hydraulic circuit 100, pressure of the front-wheel-side first caliper 115a is always kept high compared with pressure of the front-wheel-side second caliper 115b.

The braking control system of the invention is connected to a front-wheel brake to be actuated by the front-wheel hydraulic circuit 100. The front-wheel brake is configured of the front-wheel-side first caliper 115a (front-wheel interlocked brake) and the front-wheel-side second caliper 115b (front-wheel non-interlocked brake).

The front-wheel-side first caliper 115a is connected to the front-wheel-side first inlet valve 113a via the pipeline 114a as described above. The front-wheel-side second caliper 115b is connected to the front-wheel-side second inlet valve 113b via the pipeline 114b as described above.

On the other hand, the pipeline 106 is connected with a discharge side of a front-wheel-side hydraulic pump 119 via a choke. A suction side of the front-wheel-side hydraulic pump 119 is connected to a pipeline 120 via a filter. The front-wheel-side hydraulic pump 119 is driven by the DC motor 300. The pipeline 120 is connected with one end of a front-wheel-side first check valve 121. Furthermore, the pipeline 120 is connected with a discharge port of the front-wheel-side intake valve 109. The other end of the front-wheel-side first check valve 121 is connected to a pipeline 122. The front-wheel-side first check valve 121 is disposed so as to prevent backflow from the pipeline 120 to the pipeline 122.

The front-wheel-side first caliper 115a is connected with an inflow end of a front-wheel-side first outlet valve 123a via the pipeline 114a. An outflow port of the front-wheel-side first outlet valve 123a is connected to the pipeline 122. A filter is provided in a connection between an inflow port of the front-wheel-side first outlet valve 123a and the pipeline 114a. A pressure sensor 127a is provided for the pipeline 114a. The pressure sensor 127a measures pressure in the pipeline 114a, and transmits a pressure signal to the ECU 400. The front-wheel-side second check valve 116 is provided, thereby pressure in the pipeline 114b side is not higher than pressure in the pipeline 114a side. In addition, pressure in the pipeline 114a is detected by the pressure sensor 127a. Therefore, the ECU 400 may appropriately control opening/closing of each valve in the front-wheel hydraulic circuit 100 without detecting pressure in the pipeline 114b side.

Next, a configuration of the rear-wheel hydraulic circuit 200 is described using FIG. 5. The rear-wheel hydraulic circuit 200 has a brake pedal 201 to be operated by a right foot of a driver, a rear-wheel-side master cylinder 203 to be pressurized upon operation of the brake pedal 201, a rear-wheel-side master cylinder reservoir 205 connected to the rear-wheel-side master cylinder 203, a rear-wheel-side switching valve 207 connected to the rear-wheel-side master cylinder 203 via a pipeline 204, and a rear-wheel-side intake valve 209 connected to the rear-wheel-side master cylinder 203 via the pipeline 204. A filter is provided in a connection between the pipeline 204 and the rear-wheel-side switching valve 207, and in a connection between the pipeline 204 and the rear-wheel-side intake valve 209. Furthermore, a pressure sensor 211 is provided for the pipeline 204. The pressure sensor 211 detects pressure between the rear-wheel-side master cylinder 203 and the rear-wheel-side switching valve 207, and pressure between the master cylinder 203 and the rear-wheel-side intake valve 209, and transmits each pressure signal to the ECU 400.

A rear-wheel-side inlet valve 213 is connected to the rear-wheel-side switching valve 207 via a pipeline 206. A filter is provided even in a connection between the rear-wheel-side switching valve 207 and the pipeline 206, and in a connection between the rear-wheel-side inlet valve 213 and the pipeline 206. The rear-wheel-side inlet valve 213 is connected to a rear-wheel-side caliper 215 via a pipeline 214. A rear-wheel brake is configured of the rear-wheel-side caliper 215. The rear-wheel-side caliper 215 is connected to the rear-wheel-side inlet valve 213 via the pipeline 214 as described before.

On the other hand, the pipeline 206 is connected with a discharge side of a rear-wheel-side hydraulic pump 219 via a choke. A suction side of the rear-wheel-side hydraulic pump 219 is connected to a pipeline 220 via a filter. The rear-wheel-side hydraulic pump 219 is driven by the DC motor 300. The pipeline 220 is connected with one end of a rear-wheel-side check valve 221. Furthermore, the pipeline 220 is connected with a discharge port of the rear-wheel-side intake valve 209. The other end of the rear-wheel-side check valve 221 is connected to a pipeline 222. The rear-wheel-side check valve 221 is disposed to prevent backflow from the pipeline 220 to the pipeline 222.

The pipeline 222 is connected with a discharge port of a rear-wheel-side outlet valve 223. Furthermore, the pipeline 222 is connected with a rear-wheel-side reservoir (accumulator) 225 between the rear-wheel-side check valve 221 and the rear-wheel-side outlet valve 223.

The rear-wheel-side caliper 215 is connected with an inflow port of the rear-wheel-side outlet valve 223 via the pipeline 214. An outflow port of the rear-wheel-side outlet valve 223 is connected to the pipeline 222. A filter is provided in a connection between an outflow port of the rear-wheel-side outlet valve 223 and the pipeline 214. A pressure sensor 227 is provided for the pipeline 214. The pressure sensor 227 measures pressure in the pipeline 214, and transmits a pressure signal to the ECU 400.

Figure 6:
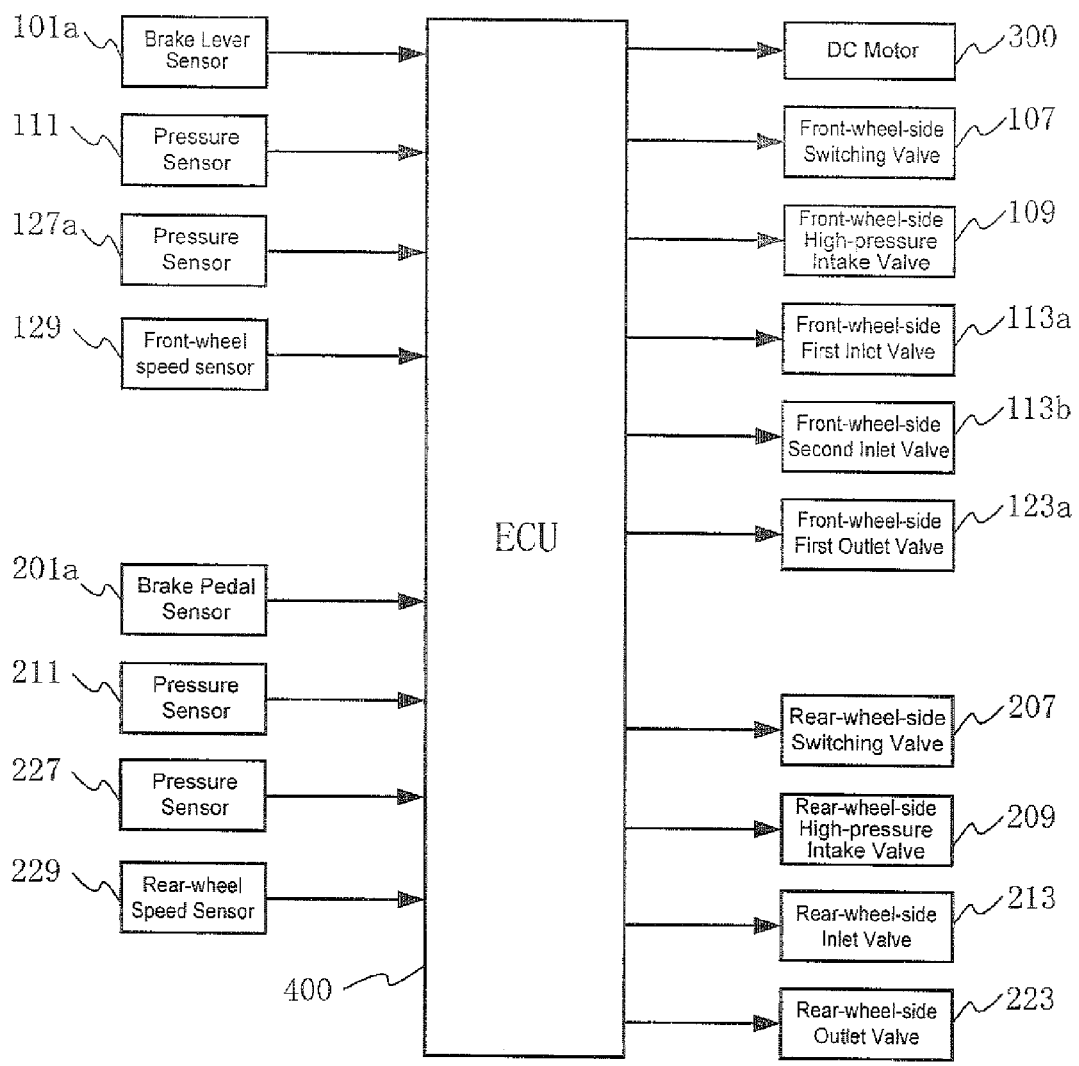
FIG. 6 is a block diagram of the braking control system of FIG. 5.

The hydraulic circuit shown in FIG. 5 is controlled by the electronic control unit (ECU) 400 shown in a block diagram of FIG. 6. The ECU 400 is connected with a brake lever sensor 101a provided in the brake lever 101, the pressure sensors 111 and 127a, and a front-wheel speed sensor 129 detecting rotational speed of a front wheel. The brake lever sensor 101a transmits an operational signal of the brake lever 101 to the ECU 400, the pressure sensors 111 and 127a transmit signals of pressure in the pipelines 104 and 114a to the ECU 400 respectively, and the front-wheel speed sensor 129 transmits a rotational speed signal of a front wheel to the ECU 400. Furthermore, the ECU 400 is connected with a brake pedal sensor 201a provided in the brake pedal 201, the pressure sensors 211 and 227, and a rear-wheel speed sensor 229 detecting rotational speed of a rear wheel. The brake pedal sensor 201 transmits an operational signal of the brake pedal 201 to the ECU 400, the pressure sensors 211 and 227 transmit signals of pressure in the pipelines 204 and 214 to the ECU 400 respectively, and the rear-wheel speed sensor 229 transmits a rotational speed signal of a rear wheel to the ECU 400.

In addition, the ECU 400 actuates each of the DC motor 300, the front-wheel-side switching valve 107, the front-wheel-side intake valve 109, the front-wheel-side first inlet valve 113a, the front-wheel-side second inlet valve 113b, the front-wheel-side first outlet valve 123a, and the front-wheel-side second outlet valve 123b according to a predetermined condition based on the operational signal, the pressure signals, and the speed signal. Furthermore, the ECU 400 actuates each of the rear-wheel-side switching valve 207, the rear-wheel-side intake valve 209, the rear-wheel-side inlet valve 213, and the rear-wheel-side outlet valve 223 according to a predetermined condition based on the operational signal, the pressure signals, and the speed signal. Each of the valves is an electromagnetic valve having a solenoid, and changed in opening/closing state upon current application by the ECU 400.

Furthermore, when the ECU 400 receives a rotational speed signal from the front-wheel speed sensor 129 or the rear-wheel speed sensor 229 and thus detects wheel lock during braking, the ECU 400 actuates an anti-lock braking system (ABS) so that the respective hydraulic pumps are actuated to open or close respective valves, so that braking force is controlled to prevent wheel lock.

Operation of the hydraulic circuit of the third embodiment is described in respective operations of a first operation where the brake pedal 201 and the brake lever 101 are sequentially operated, and a second operation where the brake lever 101 and the brake pedal 201 are sequentially operated. An opening/closing state of each valve shown in FIG. 5 shows a condition where both of the brake pedal 201 and the brake lever 101 are not operated.

First, the first operation is described, where the brake pedal 201 is first operated in a rear wheel side, and then the brake lever 101 is operated in a front wheel side. When the brake pedal 201 is first pressed on, hydraulic pressure in the rear-wheel-side master cylinder 203 is raised, and the raised hydraulic pressure is applied to the rear-wheel caliper 215 via the pipeline 204, the rear-wheel-side switching valve 207 being opened, the pipeline 206, the rear-wheel-side inlet valve 213 being opened, and the pipeline 214 in sequence, thereby the rear-wheel caliper 215 is actuated and the rear wheel is braked.

The ECU 400 detects presence of operation of the brake pedal 201 by the pressure sensor 211 in the rear-wheel hydraulic circuit 200, and detects pressure in the pipeline 214 (input braking pressure applied to the rear-wheel-side caliper 215) by the pressure sensor 227. In this situation, when the ECU 400 determines that the brake lever 101 is not operated based on a detection signal from the pressure sensor 111 in the front-wheel hydraulic circuit 100, a control mode is shifted to a front-and-rear-wheel-interlocked control mode. In the front-and-rear-wheel-interlocked control mode, the ECU 400 allows active pressure increase in the front-wheel hydraulic circuit 100, so that a front wheel is braked with an appropriate braking force value. As the appropriate ratio in braking force between the front and rear wheels, for example, a ratio shown in FIG. 6 in JP-A-2000-71963 may be used.

Specifically, while the ECU 400 closes the front-wheel-side switching valve 107, and opens the front-wheel-side intake valve 109, the ECU controls opening/closing of the front-wheel-side first inlet valve 113a, and actuates the front-wheel-side hydraulic pump 119 by the DC motor 300. Upon actuation of the front-wheel-side hydraulic pump 119, braking liquid is sucked out from the front-wheel-side master cylinder reservoir 105 via the pipeline 104 and the front-wheel-side intake valve 109, and sucked into a suction port of the front-wheel-side hydraulic pump 119 through the pipeline 120. Then, the braking liquid is discharged from the discharge port of the front-wheel-side hydraulic pump 119, so that hydraulic pressure in the pipeline 106 is raised. Since the front-wheel-side switching valve 107 is closed, hydraulic pressure in the pipeline 106 is applied to the front-wheel-side first caliper 115a via the front-wheel-side first inlet valve 113a and the pipeline 114a, so that only the front-wheel-side first caliper 115a is actuated, and consequently the front-wheel is braked with a predetermined appropriate braking force value. On the other hand, during such pressure increase, while the front-wheel-side second inlet valve 113b is kept opened, the front-wheel-side switching valve 107 is closed, and the front-wheel-side second check valve 116 prevents transfer of pressure in the pipeline 114a side to the pipeline 114b side, therefore pressure in the pipeline 114b is not raised, and consequently the front-wheel-side first caliper 115a is not operated. After the front-wheel-side first caliper 115a is increased in pressure, the front-wheel-side first outlet valve 123a is opened to relieve the increased pressure, braking liquid flows from the front-wheel-side first caliper 115a to the front-wheel-side first outlet valve 123a, so that pressure of the front-wheel-side first caliper 115a is relieved, and when the relieved pressure is lower than pressure of the front-wheel-side second caliper 115b, the front-wheel-side second check valve 116 is opened, and braking liquid flows from the front-wheel-side second caliper 115b to the front-wheel-side first outlet valve 123a, so that pressure of the front-wheel-side second caliper 115b is relieved. Therefore, increased pressure is always relieved in order of the front-wheel-side first caliper 115a and the front-wheel-side second caliper 115b.

In the past, when a driver operates the brake lever 101 on a front wheel side in this situation, since hydraulic pressure in the pipeline 104 is also raised due to the pressure increase in the front-wheel hydraulic circuit 100, unpleasantness has been felt in operation feeling of the brake lever 101. On the other hand, in the invention, while the front-wheel hydraulic circuit 100 is increased in pressure and thus only the front-wheel-side first caliper 115a is actuated as above, when a driver operates the brake lever 101, an opening/closing state of each valve is not changed in the above pressure-increased condition, that is, the front-wheel-side second inlet valve 113b is kept to be opened, therefore hydraulic pressure in the front-wheel-side master cylinder 103 is directly applied to the front-wheel-side second caliper 115b via the pipeline 104, the front-wheel-side second inlet valve 113b, and the pipeline 114b, so that the front-wheel-side second caliper 115b is actuated. In this way, when the front-wheel-side second caliper 115b operates, it is not necessary to detect presence of operation of the brake lever 101 for opening or closing a valve. Therefore, a time lag causing unpleasantness does not occur between operation timing of the brake lever 101 and actuation timing of the front-wheel-side second caliper 115b, leading to natural operation feeling of the brake lever 101.

In addition, in the invention, since the hydraulic circuit in a side of the front-wheel-side first caliper 115a (front-wheel interlocked brake) is separated from the hydraulic circuit in a side of the front-wheel-side second caliper 115b (front-wheel non-interlocked brake) in the front-wheel hydraulic circuit 100, when the front-wheel hydraulic circuit 100 is increased in pressure, only the pipeline 106, pipeline 114a and front-wheel-side first caliper 115a are increased in pressure in the front-wheel-side first caliper 115a side, and the pipeline 114b and the front-wheel-side second caliper 115b are not increased in pressure in the front-wheel-side second caliper 115b side. Such a circuit configuration reduces volume of a portion in a side being increased in pressure by the front-wheel-side hydraulic pump 119, leading to a further advantage that a response characteristic of the front-wheel-side first caliper 115a is improved during pressure increase.

At the end of the first operation, that is, at a point when the brake pedal 201 is operated in a rear wheel side, and then the brake lever 101 is operated in a front wheel side, when the ECU 400 determines that braking pressure applied to the rear-wheel caliper 215 (detection pressure of the pressure sensor 227) has reached the rear-wheel-side target braking pressure with respect to input pressure to the front-wheel-side first caliper 115a (detection pressure of the pressure sensor 127a), the ECU 400 does not allow active pressure increase in the rear-wheel-side caliper 215. Then, when detection pressure of the front-wheel-side first caliper 115a or the front-wheel-side second caliper 115b is raised, the ECU 400 selects a larger pressure value for the rear-wheel-side target braking pressure. In this situation, the ECU 400 determines that pressure of the rear-wheel-side caliper 215 becomes insufficient, and allows active pressure increase in the rear-wheel-side caliper 215.

Next, the second operation is described, where the brake lever 101 is first operated in the front wheel side, and then the brake pedal 201 is operated in the rear wheel side.

First, when the brake lever 101 is operated, upon operation of the brake lever 101, hydraulic pressure is raised in each of the front-wheel-side master cylinder 103 and the pipeline 104 in the front-wheel hydraulic circuit 100. Since the front-wheel-side switching valve 107, the front-wheel-side first inlet valve 113a, and the front-wheel-side second inlet valve 113b are opened as shown in FIG. 5, hydraulic pressure in the pipeline 104 is applied to the front-wheel-side first caliper 115a via the front-wheel-side switching valve 107, the pipeline 106, the front-wheel-side first inlet valve 113a, and the pipeline 114a, so that the front-wheel-side first caliper 115a is actuated. On the other hand, hydraulic pressure in the pipeline 104 is applied to the front-wheel-side second caliper 115b via the front-wheel-side second inlet valve 113b and the pipeline 114b, so that the front-wheel-side second caliper 115b is actuated. Consequently, the front wheel is braked by both of the front-wheel-side first caliper 115a and the front-wheel-side second caliper 115b.

The ECU 400 detects presence of operation of the brake lever 101 by the pressure sensor 111 in the front-wheel hydraulic circuit 100, and detects pressure in the pipeline 114a (input braking pressure applied to the front-wheel-side first caliper 115a) by the pressure sensor 127a. In this situation, when the ECU 400 determines that the brake pedal 201 is not operated based on a detection signal from the pressure sensor 211 in the rear-wheel hydraulic circuit 200, a control mode is shifted to a front-and-rear-wheel-interlocked control mode. In the front-and-rear-wheel-interlocked control mode, the ECU 400 allows active pressure increase in the rear-wheel hydraulic circuit 200, so that a rear wheel is braked with an appropriate braking force value.

Specifically, while the ECU 400 closes the rear-wheel-side switching valve 207, and opens the rear-wheel-side intake valve 209, the ECU controls opening/closing of the rear-wheel-side inlet valve 213, and actuates the rear-wheel-side hydraulic pump 219 by the DC motor 300. Upon actuation of the rear-wheel-side hydraulic pump 219, braking liquid is sucked out from the rear-wheel-side master cylinder reservoir 205 via the pipeline 204 and the rear-wheel-side intake valve 209, and discharged from the discharge port of the rear-wheel-side hydraulic pump 219 through the pipeline 220, so that hydraulic pressure in the pipeline 206 is raised. Since the rear-wheel-side switching valve 207 is closed, the raised hydraulic pressure in the pipeline 206 is applied to the rear-wheel-side caliper 215 via the rear-wheel-side inlet valve 213, so that the rear-wheel-side caliper 215 is actuated, and consequently the rear-wheel is braked with a predetermined appropriate braking force value.

At the end of the second operation, that is, at a point when the brake lever 101 is operated in a front wheel side, and then the brake pedal 201 is operated in a rear wheel side, when the ECU 400 determines that braking pressure applied to the front-wheel-side first caliper 115a (detection pressure of the pressure sensor 127a) has reached the front-wheel-side target braking pressure with respect to braking pressure of the rear-wheel-side caliper 215 (detection pressure of the pressure sensor 227), the ECU 400 does not allow active pressure increase in the front-wheel-side first caliper 115a. Then, when detection pressure of the rear-wheel caliper 215 is raised, the ECU 400 selects a larger pressure value for the front-wheel-side target braking pressure. In this situation, the ECU 400 determines that pressure of one of the front-wheel-side first caliper 115a and the front-wheel-side second caliper 115b becomes insufficient, and allows active pressure increase in the front-wheel-side first caliper 115a.

In the description of operation of the hydraulic circuit, a signal on presence of operation of the brake lever 101 or the brake pedal 201, the signal being necessary for active pressure increase, is a signal from the pressure sensor 111 detecting hydraulic pressure in the front-wheel-side master cylinder 103, or a signal from the pressure sensor 211 detecting hydraulic pressure in the rear-wheel-side master cylinder 203, and a signal from the brake lever sensor 101a or a signal from the brake pedal sensor 201a is used as a backup signal for the signal from the pressure sensor 111 or 211. The backup signal means a signal for operation that when the ECU 400 determines that the pressure sensor 111 or 211 is failed, the ECU 400 allows active pressure increase in a portion at an interlocked side according to an operational signal from the brake lever 101 or the brake pedal 201, The invention may be applied to a scooter where right and left levers are used for braking of front and rear wheels. In this case, the same hydraulic circuit as the front-wheel hydraulic circuit 100 is used as a rear-wheel hydraulic circuit in place of the rear-wheel hydraulic circuit 200. Thus, operation feeling of right and left brake levers may be improved.

The third embodiment is configured by simplifying a configuration of the braking control system according to the second embodiment. The second embodiment is different from the third embodiment in that the front-wheel-side first caliper 115a and the front-wheel-side second caliper 115b are not connected to each other, and the calipers have outlet valves respectively. Therefore, compared with the second embodiment, the third embodiment may provide reduced number of components, improved assembling performance, and a simple configuration of the hydraulic circuit, leading to improvement in reliability and space saving.

[Fourth Embodiment]

Figure 7:
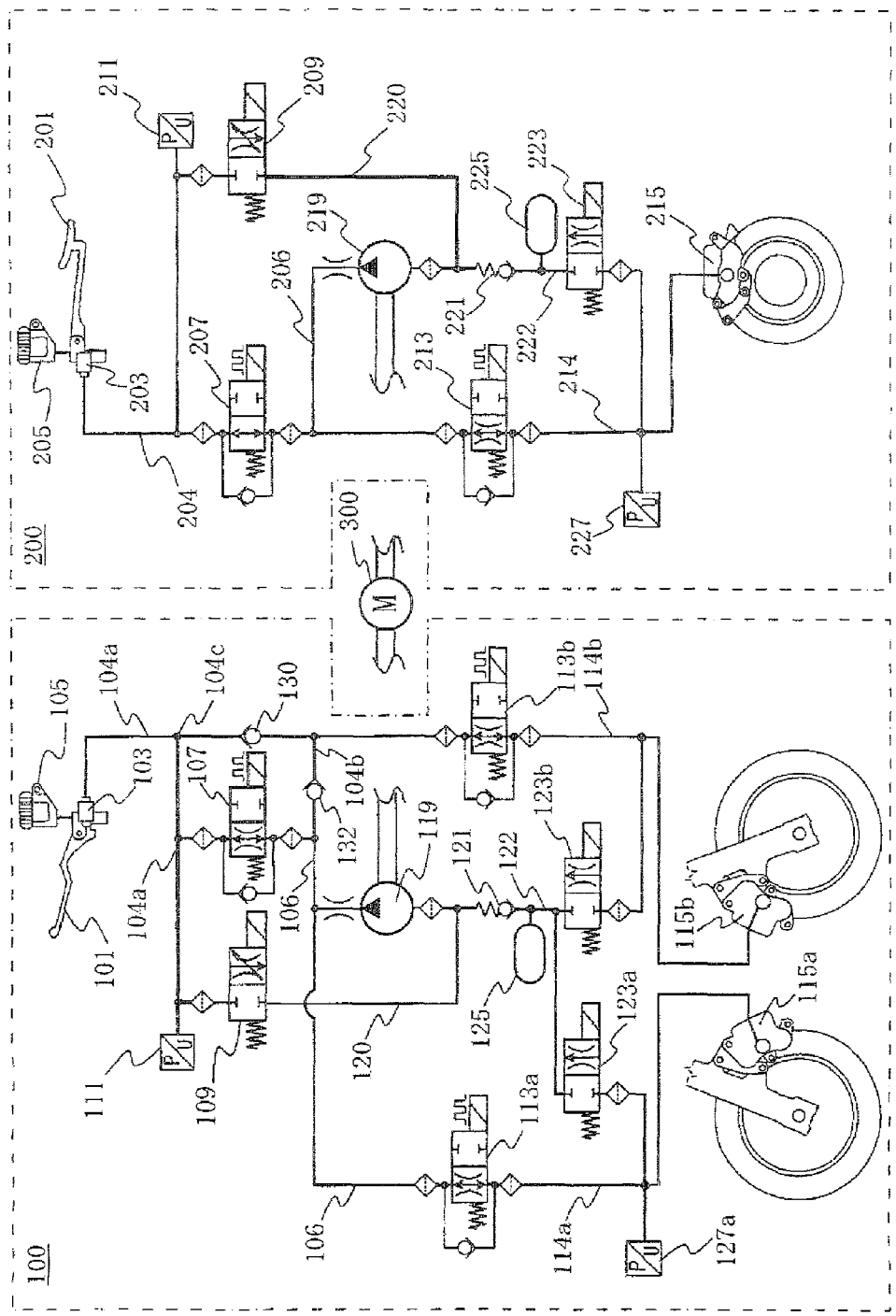
FIG. 7 is a hydraulic circuit diagram used for a braking control system of a fourth embodiment of the invention.

FIG. 7 shows a hydraulic circuit of a braking control system according to a fourth embodiment of the invention. The hydraulic circuit of FIG. 7 is similar to the hydraulic circuit of the second embodiment shown in FIG. 3, and described in only different portions from the second embodiment.

In FIG. 7, a front-wheel-side third check valve (front-wheel-side third backflow-check-means) 130 is provided in a pipeline between a front-wheel-side master cylinder 103 and a front-wheel-side second inlet valve 113b. The front-wheel-side third check valve 130 prevents backflow of braking liquid from a side of the front-wheel-side second inlet valve 113b to a side of the front-wheel-side master cylinder 103. A pipeline 104a between the front-wheel-side master cylinder 103 and the front-wheel-side third check valve 130 is connected with a front-wheel-side switching valve 107, a front-wheel-side high-pressure intake valve 109, and a pressure sensor 111.

A pipeline 104b between the front-wheel-side third check valve 130 and the front-wheel-side second inlet valve 113b is connected with a pipeline 106 via a front-wheel-side fourth check valve (front-wheel-side fourth backflow-check-means) 132. The front-wheel-side fourth check valve 132 prevents backflow of braking liquid from a side of the front-wheel-side switching valve 107, a front-wheel-side hydraulic pump 119, and a front-wheel-side first inlet valve 113a to a side of the front-wheel-side master cylinder 103 and the front-wheel-side second inlet valve 113b.

Next, operation of each of the front-wheel-side third check valve 130 and the front-wheel-side fourth check valve 132 is described. When the front-wheel-side first caliper 115a is increased in pressure, the front-wheel-side switching valve 107 and a front-wheel-side first outlet valve 123a are closed, and the front-wheel-side high-pressure intake valve 109 and the front-wheel-side first inlet valve 113a are opened. In this situation, the front-wheel-side hydraulic pump 119 operates so that braking liquid is sucked out from a front-wheel-side master cylinder reservoir 105 via the pipeline 104a, the front-wheel-side intake valve 109 and a pipeline 120. The sucked-out braking liquid is introduced from a discharge side of the front-wheel-side hydraulic pump 119 to the front-wheel-side first caliper 115a via the pipeline 106, the front-wheel-side first inlet valve 113a, and the pipeline 114a, so that the front-wheel-side first caliper 115a is increased in pressure. At that time, the front-wheel-side third check valve 130 prevents the braking liquid from being sucked out from the side of the pipeline 104b, the front-wheel-side second inlet valve 113b, the pipeline 114b and the front-wheel-side second caliper 115b, in addition, the front-wheel-side fourth check valve 132 prevents the braking liquid discharged by the front-wheel-side hydraulic pump 119 from flowing from the pipeline 106 to a pipeline 104b side.

In normal braking, while hydraulic pressure caused by operation of the brake lever 101 is applied to the front-wheel-side first caliper 115a via the pipeline 104a, the front-wheel-side switching valve 107, the pipeline 106, the front-wheel-side first inlet valve 113a, and the pipeline 114a, the hydraulic pressure is applied to the front-wheel-side second caliper 115b via the pipeline 104a, the front-wheel-side third check valve 130, the pipeline 104b, and the front-wheel-side second inlet valve 113b. In this case, the same hydraulic pressure is applied to both ends of the front-wheel-side fourth check valve 132, and the same hydraulic pressure is applied to both of the front-wheel-side first caliper 115a and the front-wheel-side second caliper 115b.

In the fourth embodiment, the front-wheel-side third check valve 130 is provided, which may avoid a situation that negative pressure is applied to the side of the pipeline 104b, the front-wheel-side second inlet valve 113b, the pipeline 114b, and the front-wheel-side second caliper 115b during the pressure increase, so that a piston (not shown) of the front-wheel-side second caliper 115b is drawn into a cylinder (not shown) of the caliper 115b.

After the normal braking operation, when a hand is separated from the brake lever 101, the braking liquid filled in the front-wheel-side second caliper 115b returns to the front-wheel-side master cylinder 103 through the pipeline 114b, the front-wheel-side second inlet valve 113b, the pipeline 104b, the front-wheel-side fourth check valve 132, the front-wheel-side switching valve 107, and the pipeline 104a.

In the fourth embodiment, the front-wheel-side third check valve 130 for preventing negative pressure from being applied to the front-wheel-side second caliper 115b needs to be always provided in a lower stream of a branch point 104c of the pipeline 104a running from the front-wheel-side master cylinder 103 to the front-wheel-side switching valve 107. Moreover, when only the function of preventing negative pressure is focused, the front-wheel-side third check valve 130 having such a function of preventing negative pressure may be provided at a place in any pipeline to the caliper 115b if the place is in a lower stream of the branch point 104c. However, the front-wheel-side fourth check valve 132 needs to be always disposed in a downstream pipeline with respect to the front-wheel-side third check valve 130, that is, in the pipeline 104b in the fourth embodiment. A destination to be connected with the front-wheel-side fourth check valve 132 is always in a primary side of a brake circuit of a boost control system (circuit at a side where the front-wheel-side first caliper 115a is increased in pressure).

[Fifth Embodiment]

Figure 8:
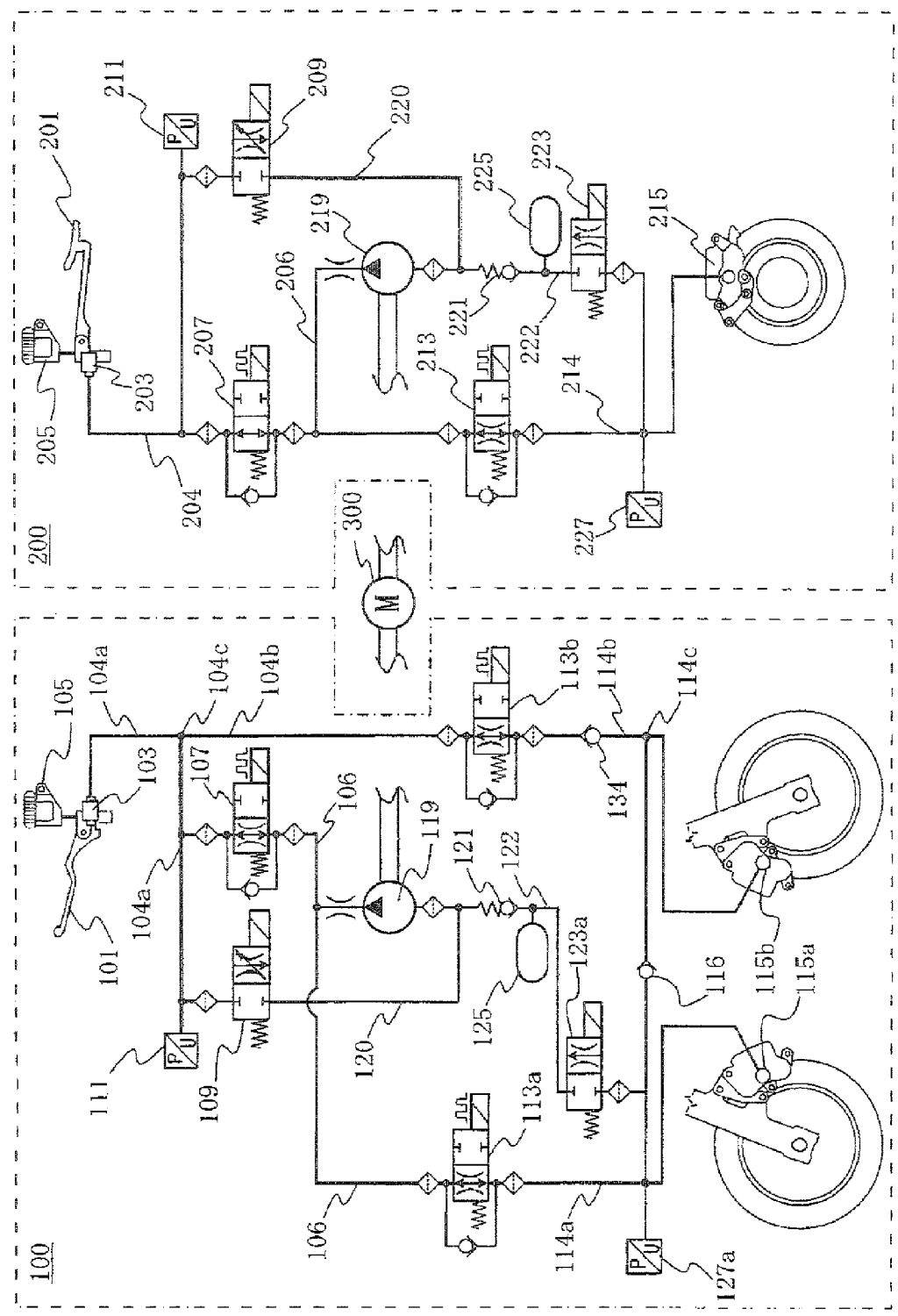
FIG. 8 is a hydraulic circuit diagram used for a braking control system of a fifth embodiment of the invention.

FIG. 8 shows a hydraulic circuit of a braking control system according to a fifth embodiment of the invention. The hydraulic circuit of FIG. 8 is similar to the hydraulic circuit of the third embodiment shown in FIG. 5, and described in only different portions from the third embodiment.

In FIG. 8, a front-wheel-side fifth check valve (front-wheel-side fifth backflow-check-means) 134 is provided in a pipeline 114b. The front-wheel-side fifth check valve 134 prevents backflow of braking liquid from a side of a front-wheel-side second caliper 115b to a side of a front-wheel-side second inlet valve 113b. In the fifth embodiment, the front-wheel-side fifth check valve 134 is provided, which may avoid a situation that when a front-wheel-side first caliper 115a is increased in pressure, negative pressure is applied to a side of the pipeline 114b and the front-wheel-side second caliper 115b, so that a piston (not shown) of the front-wheel-side second caliper 115b is drawn into a cylinder (not shown) of the caliper 115b.

After normal braking operation, when a hand is separated from a brake lever 101, the braking liquid filled in the front-wheel-side second caliper 115b returns to a front-wheel-side master cylinder 103 through a branch point 114c of the pipeline 114b, a front-wheel-side second check valve 116, a pipeline 114a, a front-wheel-side first inlet valve 113a, a pipeline 106, a front-wheel-side switching valve 107, and a pipeline 104.

Even in the fifth embodiment, the front-wheel-side fifth check valve 134 for preventing negative pressure from being applied to the front-wheel-side second caliper 115b needs to be always provided in a lower stream of a branch point 104c of a pipeline 104a running from the front-wheel-side master cylinder 103 to the front-wheel-side switching valve 107. Moreover, when only the function of preventing negative pressure is focused, the front-wheel-side fifth check valve 134 having such a function of preventing negative pressure may be provided at a place in any pipeline to the caliper 115b if the place is in a lower stream of the branch point 104c. However, the front-wheel-side second check valve 116 needs to be always disposed in a downstream pipeline with respect to the front-wheel-side fifth check valve 134, that is, in a lower stream side with respect to the branch point 114c of the pipeline 114b in the fifth embodiment. A destination to be connected with the front-wheel-side second check valve 116 is always in a primary side of a brake circuit of a boost control system (circuit at a side where the front-wheel-side first caliper 115a is increased in pressure).

The invention may be applied to a scooter where right and left levers are used for braking of front and rear wheels. In this case, the same hydraulic circuit as the front-wheel hydraulic circuit 100 is used as a rear-wheel hydraulic circuit in place of the rear-wheel hydraulic circuit 200. Thus, operation feeling of right and left brake levers may be improved.

The invention claimed is:

1. A braking control system of a two-wheeled motor vehicle, comprising:
   a first braking operation unit,
   a first-wheel brake to be actuated by the first braking operation unit,
   a first-wheel hydraulic circuit transmitting operation of the first braking operation unit to the first-wheel brake,
   a second braking operation unit,
   a second-wheel brake to be actuated by the second braking operation unit,
   a second-wheel hydraulic circuit transmitting operation of the second braking operation unit to the second-wheel brake, and
   a control unit for performing both-wheel-interlocked braking control that allows the first-wheel brake and the second-wheel brake to operate in an interlocked manner,
   the first-wheel brake including a first-wheel interlocked brake that operates according to the both-wheel-interlocked braking control, and a first-wheel non-interlocked brake that does not operate according to the both-wheel-interlocked braking control, wherein the first-wheel hydraulic circuit comprises a first-wheel-side master cylinder connected to the first braking operation unit, a first-wheel-side switching valve connected to the first-wheel-side master cylinder, a first-wheel-side first inlet valve that is connected to the first-wheel-side switching valve at one end, and is connected to the first-wheel interlocked brake at the other end, a first-wheel-side second inlet valve that is connected to the first-wheel-side master cylinder at one end, and connected to the first-wheel non-interlocked brake at the other end, a first-wheel-side intake valve that is connected to the first-wheel-side master cylinder at one end, wherein the braking control system comprises a normal-brake-operable condition and an active pressure increase condition of the first wheel brake with the braking control system being shifted to both-wheel-interlocked braking mode, wherein under an active pressure increase condition of the first wheel brake, the control unit controls such that the first-wheel-side intake valve is opened, the first-wheel-side switching valve is closed, and the first-wheel-side first inlet valve is opened, whereby the first-wheel interlocked brake is increased in pressure and thus used for the both-wheel-interlocked braking control in a manner of being interlocked with the second-wheel brake, and the control unit keeps the first-wheel-side second inlet valve to be opened such that the first-wheel non-interlocked brake receives hydraulic pressure caused along with operation of the first braking operation unit during the pressure increase.

2. The braking control system of a two-wheeled motor vehicle according to claim 1, wherein under the normal-brake-operable condition, the control unit controls such that the first-wheel-side switching valve is opened, the first-wheel-side intake valve is closed, and the first-wheel-side first inlet valve and the first-wheel-side second inlet valve are opened, whereby the hydraulic pressure generated by operation of the first braking operation unit is applied to the first-wheel brake via the first-wheel interlocked brake and the first-wheel non-interlocked brake.

3. The braking control system of a two-wheeled motor vehicle according to claim 2, wherein the active pressure increase condition of the first wheel brake includes a state where the second-wheel brake is operated, and the first-wheel brake is not operated.

4. The braking control system of a two-wheeled motor vehicle according to claim 2, wherein the first-wheel non-interlocked brake receives hydraulic pressure caused along with operation of the first braking operation unit during performing the both-wheel-interlocked braking control.

5. The braking control system of a two-wheeled motor vehicle according to claim 4, further having a first-wheel-side master cylinder connected to the first braking operation unit, wherein the first-wheel-side master cylinder is hydraulically connected to the first-wheel non-interlocked brake during performing the both-wheel-interlocked braking control.

6. The braking control system of a two-wheeled motor vehicle according to claim 2, further having a first-wheel-side master cylinder connected to the first braking operation unit, wherein the first-wheel-side master cylinder is hydraulically connected to the first-wheel non-interlocked brake during performing the both-wheel-interlocked braking control.

7. The braking control system of a two-wheeled motor vehicle according to claim 6, wherein the first-wheel hydraulic circuit has a first-wheel-side master-cylinder pressure sensor that detects pressure of the first-wheel-side master cylinder, and transmits a pressure signal to the control unit, and the control unit allows pressure increase in the second-wheel brake based on the pressure detected by the first-wheel-side master-cylinder pressure sensor.

8. The braking control system of a two-wheeled motor vehicle according to claim 6, wherein the first-wheel hydraulic circuit has a first-wheel interlocked-brake pressure sensor that detects pressure in a pipeline between the first-wheel-side first inlet valve and the first-wheel interlocked brake, and transmits a pressure signal to the control unit, and a first-wheel non-interlocked brake pressure sensor that detects pressure in a pipeline between the first-wheel-side second inlet valve and the first-wheel non-interlocked brake, and transmits a pressure signal to the control unit.

9. The braking control system of a two-wheeled motor vehicle according to claim 2, wherein the first-wheel hydraulic circuit has a first-wheel-side master-cylinder pressure sensor that detects pressure of the first-wheel-side master cylinder, and transmits a pressure signal to the control unit, and the control unit allows pressure increase in the second-wheel brake based on the pressure detected by the first-wheel-side master-cylinder pressure sensor.

10. The braking control system of a two-wheeled motor vehicle according to claim 2, wherein the first-wheel hydraulic circuit has a first-wheel interlocked-brake pressure sensor that detects pressure in a pipeline between the first-wheel-side first inlet valve and the first-wheel interlocked brake, and transmits a pressure signal to the control unit, and a first-wheel non-interlocked brake pressure sensor that detects pressure in a pipeline between the first-wheel-side second inlet valve and the first-wheel non-interlocked brake, and transmits a pressure signal to the control unit.

11. The braking control system of a two-wheeled motor vehicle according to claim 2, wherein the second-wheel hydraulic circuit has a second-wheel-side master cylinder connected to the second braking operation unit, a second-wheel-side switching valve connected to the second-wheel-side master cylinder, a second-wheel-side inlet valve that is connected to the second-wheel-side switching valve at one end, and connected to the second-wheel brake at the other end, a second-wheel-side outlet valve that is connected to the second-wheel brake to relieve hydraulic pressure of the second-wheel brake, a second-wheel-side hydraulic pump connected to the second-wheel-side outlet valve, and a second-wheel-side intake valve that is connected to the second-wheel-side master cylinder at one end, and connected to a suction side of the second-wheel-side hydraulic pump at the other end, and in the case that operation amount of the second-wheel brake does not reach a predetermined value with respect to operation amount of the first-wheel brake, to interlock the second-wheel brake with the first-wheel brake, the control unit actuates the second-wheel-side hydraulic pump to increase pressure of the second-wheel brake by the second-wheel-side hydraulic pump so that the second-wheel brake is actuated and used for the both-wheel-interlocked braking control.

12. The braking control system of a two-wheeled motor vehicle according to claim 11, wherein the second-wheel hydraulic circuit has a second-wheel brake pressure sensor that detects pressure in a pipeline between the second-wheel-side inlet valve and the second-wheel brake, and transmits a pressure signal to the control unit.

13. The braking control system of a two-wheeled motor vehicle according to claim 11, wherein the second-wheel hydraulic circuit has a second-wheel-side master-cylinder pressure sensor that detects pressure of the second-wheel-side master cylinder, and transmits a pressure signal to the control unit, and the control unit allows pressure increase in the first-wheel interlocked brake based on the pressure detected by the second-wheel-side master-cylinder pressure sensor.

14. The braking control system of a two-wheeled motor vehicle according to claim 13, wherein the second-wheel hydraulic circuit has a second-wheel brake pressure sensor that detects pressure in a pipeline between the second-wheel-side inlet valve and the second-wheel brake, and transmits a pressure signal to the control unit.

15. The braking control system of a two-wheeled motor vehicle according to claim 2, wherein the first braking operation unit is manually operated.

16. The braking control system of a two-wheeled motor vehicle according to claim 2, further having backflow check means, by which when the first-wheel interlocked brake operates according to the both-wheel-interlocked braking control, braking liquid is prevented from being sucked out from the first-wheel non-interlocked brake.

17. A braking control system of a two-wheeled motor vehicle according to claim 2, the first-wheel interlocked brake is hydraulically connected to the first-wheel non-interlocked brake so as to prevent transmission of hydraulic pressure from a side of the first-wheel interlocked brake to a side of the first-wheel non-interlocked brake.

18. The braking control system of a two-wheeled motor vehicle according to claim 17, wherein the first-wheel interlocked brake is hydraulically connected to the first-wheel non-interlocked brake so as to allow only transmission of hydraulic pressure from the side of the first-wheel non-interlocked brake to the side of the first-wheel interlocked brake.

19. The braking control system of a two-wheeled motor vehicle according to claim 18, wherein the first-wheel non-interlocked brake receives hydraulic pressure caused along with operation of the first braking operation unit during performing the both-wheel-interlocked braking control.

20. The braking control system of a two-wheeled motor vehicle according to claim 17, wherein the first-wheel non-interlocked brake receives hydraulic pressure caused along with operation of the first braking operation unit during performing the both-wheel-interlocked braking control.

21. The braking control system of a two-wheeled motor vehicle according to claim 20, wherein the first-wheel hydraulic circuit has a first-wheel-side master cylinder connected to the first braking operation unit, a first-wheel-side switching valve connected to the first-wheel-side master cylinder, a first-wheel-side first inlet valve that is connected to the first-wheel-side switching valve at one end, and connected to the first-wheel interlocked brake at the other end, a first-wheel-side second inlet valve that is connected to the first-wheel-side master cylinder at one end, and connected to the first-wheel non-interlocked brake at the other end, a first-wheel-side outlet valve that is connected to the first-wheel interlocked brake and to the first-wheel non-interlocked brake to relive hydraulic pressure of each of the first-wheel interlocked brake and the first-wheel non-interlocked brake, backflow check means that is provided between the first-wheel-side outlet valve and the first-wheel non-interlocked brake, and prevents backflow of hydraulic pressure from the first-wheel interlocked brake to the first-wheel non-interlocked brake, a first-wheel-side hydraulic pump connected to the first-wheel-side outlet valve, and a first-wheel-side intake valve that is connected to the first-wheel-side master cylinder at one end, and connected to a suction side of the first-wheel-side hydraulic pump at the other end, and in the case that the second-wheel brake is operated, and the first-wheel brake is not operated, to perform the both-wheel-interlocked braking control, the control unit actuates the first-wheel-side hydraulic pump while the first-wheel-side intake valve is opened, the first-wheel-side switching valve is closed, and the first-wheel-side first inlet valve is opened, thereby the first-wheel interlocked brake is increased in pressure by the first-wheel-side hydraulic pump and thus used for the both-wheel-interlocked braking control in a manner of being interlocked with the second-wheel brake, and the control unit keeps the first-wheel-side second inlet valve to be opened such that the first-wheel non-interlocked brake receives hydraulic pressure caused along with operation of the first braking operation unit during the pressure increase.

22. The braking control system of a two-wheeled motor vehicle according to claim 20, wherein the first-wheel hydraulic circuit has a first-wheel-side master-cylinder pressure sensor that detects pressure of the first-wheel-side master cylinder, and transmits a pressure signal to the control unit, and the control unit allows pressure increase in the second-wheel brake based on the pressure detected by the first-wheel-side master-cylinder pressure sensor.

23. The braking control system of a two-wheeled motor vehicle according to claim 20, wherein the first-wheel hydraulic circuit has a first-wheel-interlocked-brake pressure sensor that detects pressure in a pipeline between the first-wheel-side first inlet valve and the first-wheel interlocked brake, and transmits a pressure signal to the control unit.

24. The braking control system of a two-wheeled motor vehicle according to claim 17, further having a first-wheel-side master cylinder connected to the first braking operation unit, wherein the first-wheel-side master cylinder is hydraulically connected to the first-wheel non-interlocked brake during performing the both-wheel-interlocked braking control.

25. The braking control system of a two-wheeled motor vehicle according to claim 24, wherein the first-wheel hydraulic circuit has a first-wheel-side master cylinder connected to the first braking operation unit, a first-wheel-side switching valve connected to the first-wheel-side master cylinder, a first-wheel-side first inlet valve that is connected to the first-wheel-side switching valve at one end, and connected to the first-wheel interlocked brake at the other end, a first-wheel-side second inlet valve that is connected to the first-wheel-side master cylinder at one end, and connected to the first-wheel non-interlocked brake at the other end, a first-wheel-side outlet valve that is connected to the first-wheel interlocked brake and to the first-wheel non-interlocked brake to relive hydraulic pressure of each of the first-wheel interlocked brake and the first-wheel non-interlocked brake, backflow check means that is provided between the first-wheel-side outlet valve and the first-wheel non-interlocked brake, and prevents backflow of hydraulic pressure from the first-wheel interlocked brake to the first-wheel non-interlocked brake, a first-wheel-side hydraulic pump connected to the first-wheel-side outlet valve, and a first-wheel-side intake valve that is connected to the first-wheel-side master cylinder at one end, and connected to a suction side of the first-wheel-side hydraulic pump at the other end, and in the case that the second-wheel brake is operated, and the first-wheel brake is not operated, to perform the both-wheel-interlocked braking control, the control unit actuates the first-wheel-side hydraulic pump while the first-wheel-side intake valve is opened, the first-wheel-side switching valve is closed, and the first-wheel-side first inlet valve is opened, thereby the first-wheel interlocked brake is increased in pressure by the first-wheel-side hydraulic pump and thus used for the both-wheel-interlocked braking control in a manner of being interlocked with the second-wheel brake, and the control unit keeps the first-wheel-side second inlet valve to be opened such that the first-wheel non-interlocked brake receives hydraulic pressure caused along with operation of the first braking operation unit during the pressure increase.

26. The braking control system of a two-wheeled motor vehicle according to claim 24, wherein the first-wheel hydraulic circuit has a first-wheel-side master-cylinder pressure sensor that detects pressure of the first-wheel-side master cylinder, and transmits a pressure signal to the control unit, and the control unit allows pressure increase in the second-wheel brake based on the pressure detected by the first-wheel-side master-cylinder pressure sensor.

27. The braking control system of a two-wheeled motor vehicle according to claim 24, wherein the first-wheel hydraulic circuit has a first-wheel-interlocked-brake pressure sensor that detects pressure in a pipeline between the first-wheel-side first inlet valve and the first-wheel interlocked brake, and transmits a pressure signal to the control unit.

28. The braking control system of a two-wheeled motor vehicle according to claim 17, wherein the second-wheel hydraulic circuit has a second-wheel-side master cylinder connected to the second braking operation unit, a second-wheel-side switching valve connected to the second-wheel-side master cylinder, a second-wheel-side inlet valve that is connected to the second-wheel-side switching valve at one end, and connected to the second-wheel brake at the other end, a second-wheel-side outlet valve that is connected to the second-wheel brake to relieve hydraulic pressure of the second-wheel brake, a second-wheel-side hydraulic pump connected to the second-wheel-side outlet valve, and a second-wheel-side intake valve that is connected to the second-wheel-side master cylinder at one end, and connected to a suction side of the second-wheel-side hydraulic pump at the other end, and in the case that operation amount of the second-wheel brake does not reach a predetermined value with respect to operation amount of the first-wheel brake, to interlock the second-wheel brake with the first-wheel brake, the control unit actuates the second-wheel-side hydraulic pump to increase pressure of the second-wheel brake by the second-wheel-side hydraulic pump so that the second-wheel brake is actuated and used for the both-wheel-interlocked braking control.

29. The braking control system of a two-wheeled motor vehicle according to claim 28, wherein the second-wheel hydraulic circuit has a second-wheel brake pressure sensor that detects pressure in a pipeline between the second-wheel-side inlet valve and the second-wheel brake, and transmits a pressure signal to the control unit.

30. The braking control system of a two-wheeled motor vehicle according to claim 28, wherein the second-wheel hydraulic circuit has a second-wheel-side master-cylinder pressure sensor that detects pressure of the second-wheel-side master cylinder, and transmits a pressure signal to the control unit, and the control unit allows pressure increase in the first-wheel interlocked brake based on the pressure detected by the second-wheel-side master-cylinder pressure sensor.

31. The braking control system of a two-wheeled motor vehicle according to claim 30, wherein the second-wheel hydraulic circuit has a second-wheel brake pressure sensor that detects pressure in a pipeline between the second-wheel-side inlet valve and the second-wheel brake, and transmits a pressure signal to the control unit.

32. The braking control system of a two-wheeled motor vehicle according to claim 17, wherein the first braking operation unit is manually operated.

33. The braking control system of a two-wheeled motor vehicle according to claim 17, further having backflow check means, by which when the first-wheel interlocked brake operates according to the both-wheel-interlocked braking control, braking liquid is prevented from being sucked out from the first-wheel non-interlocked brake.

\* \* \* \* \*